(12) United States Patent
Akashi

(10) Patent No.: US 10,378,084 B2
(45) Date of Patent: Aug. 13, 2019

(54) METHOD FOR CONCENTRATING METAL COMPOUND BY REDUCTION AND OXIDATION

(71) Applicant: Hosei University, Tokyo (JP)

(72) Inventor: Takaya Akashi, Tokyo (JP)

(73) Assignee: HOSEI UNIVERSITY, Tokyo (JP)

( * ) Notice: Subject to any disclaimer, the term of this patent is extended or adjusted under 35 U.S.C. 154(b) by 415 days.

(21) Appl. No.: 14/424,830

(22) PCT Filed: Sep. 2, 2013

(86) PCT No.: PCT/JP2013/073500
§ 371 (c)(1),
(2) Date: Feb. 27, 2015

(87) PCT Pub. No.: WO2014/034925
PCT Pub. Date: Mar. 16, 2014

(65) Prior Publication Data
US 2015/0225812 A1     Aug. 13, 2015

(30) Foreign Application Priority Data

Aug. 31, 2012 (JP) ................................. 2012-191071

(51) Int. Cl.
    *C22B 58/00* (2006.01)
    *C01G 15/00* (2006.01)
    (Continued)

(52) U.S. Cl.
    CPC .......... *C22B 58/00* (2013.01); *B01J 19/2415* (2013.01); *C01B 19/004* (2013.01); *C01D 17/00* (2013.01);
    (Continued)

(58) Field of Classification Search
    CPC .......... C22B 58/00; C01G 15/00; C01G 1/00; C01D 17/00
    See application file for complete search history.

(56) References Cited

U.S. PATENT DOCUMENTS 2,962,370 A * 11/1960 Foster .................... C22B 58/00
                                                     423/135
3,468,773 A * 9/1969 Halota .................... C22B 58/00
                                                     205/557
(Continued)

FOREIGN PATENT DOCUMENTS

| CN | 101407864 A | 4/2009 |
| CN | 101476042 A | 7/2009 |

(Continued)

OTHER PUBLICATIONS

Office Action dated Aug. 12, 2016, issued in counterpart Chinese Application No. 201380045023.8, with English translation (18 pages).

(Continued)

*Primary Examiner* — Melissa S Swain
(74) *Attorney, Agent, or Firm* — United IP Counselors, LLC

(57) ABSTRACT

To concentrate metals such as gallium from ore which is extracted from mines or used electronic components while suppressing the quantity of waste liquid generated is difficult. A first solid metal compound which contains a metal selected from a group consisting of gallium, indium, germanium, tellurium, and cesium at a first metal content in a mixture of the first solid metal compound is reduced to form a gaseous metal compound, the gaseous metal compound is oxidized to form a second solid metal compound, and the second solid metal compound is collected at a second metal content which is higher than the first metal content.

12 Claims, 12 Drawing Sheets

(51) Int. Cl.
*C01D 17/00* (2006.01)
*C01G 17/00* (2006.01)
*C22B 5/10* (2006.01)
*C22B 5/12* (2006.01)
*C22B 7/00* (2006.01)
*C01B 19/00* (2006.01)
*C01G 17/02* (2006.01)
*B01J 19/24* (2006.01)

(52) U.S. Cl.
CPC ............ *C01G 15/00* (2013.01); *C01G 17/00* (2013.01); *C01G 17/02* (2013.01); *C22B 5/10* (2013.01); *C22B 5/12* (2013.01); *C22B 7/00* (2013.01); *C22B 7/001* (2013.01); *B01J 2219/00128* (2013.01); *B01J 2219/24* (2013.01); *Y02P 10/212* (2015.11)

(56) References Cited

U.S. PATENT DOCUMENTS

| | | | |
|---|---|---|---|
| 4,081,523 A | | 3/1978 | Pfundt et al. |
| 4,686,031 A | * | 8/1987 | Lisowyj .................... B03B 9/04 209/10 |
| 6,319,483 B1 | | 11/2001 | Kudo et al. |
| 6,337,057 B1 | | 1/2002 | Bohrer et al. |
| 2004/0083854 A1 | * | 5/2004 | Tayama .................... C22B 9/04 75/595 |
| 2010/0189637 A1 | * | 7/2010 | Roth ........................ C22B 1/04 423/622 |

FOREIGN PATENT DOCUMENTS

| | | |
|---|---|---|
| CN | 101680054 A | 3/2010 |
| JP | 50-119795 | 9/1975 |
| JP | 51-126997 | 11/1976 |
| JP | 53-103998 A | 9/1978 |
| JP | 61-6101 A | 1/1986 |
| JP | 64-75633 A | 3/1989 |
| JP | 3-229831 A | 10/1991 |
| JP | 10-206594 A | 8/1998 |
| JP | 10-324933 A | 12/1998 |
| JP | 11-248880 A | 9/1999 |
| JP | 2000-273558 A | 10/2000 |
| JP | 2001-58823 A | 3/2001 |
| JP | 2001-97716 A | 4/2001 |
| JP | 2002-348622 A | 12/2002 |
| JP | 2010-528180 A | 8/2010 |

OTHER PUBLICATIONS

Mizuno, Hirobumi et al., "Electrodeposition of Gallium on Gallium Electrode in Bayer Solution", Bulletin of the Faculty of Engineering, Hokkaido University, No. 152 (1990) pp. 31-46.
International Search Report dated Jan. 28, 2014, issued in corresponding application No. PCT/JP2013/073500.
Office Action dated Mar. 27, 2017, issued in counterpart Chinese Application No. 201380045023.8, with English machine translation. (19 pages).
Office Action dated Oct. 20, 2017, issued in counterpart Chinese Application No. 201380045023.8, with English tanslation. (19 pages).
Decision to Grant a Patent dated Jul. 10, 2017, issued in counterpart Japanese Application No. 2014-533147, with English machine translation. (5 pages).
Written Opinion of the International Searching Authority dated Jan. 28, 2014, issued in counterpart International Application No. PCT/JP2013/073500, with English translation. (7 pages).
International Preliminary Report on Patentability (Form PCT/IB/373) issued in counterpart International Application No. PCT/JP2013/073500 dated Mar. 3, 2015, with Form PCT/ISA/237. (5 pages).

\* cited by examiner

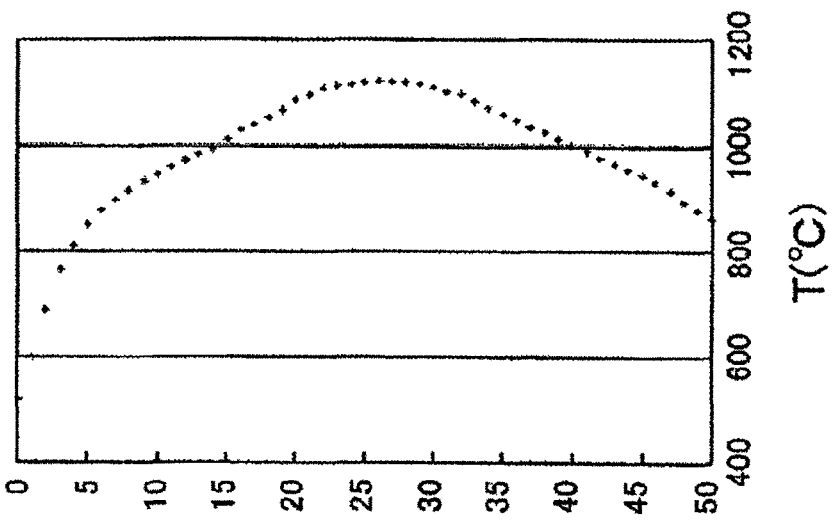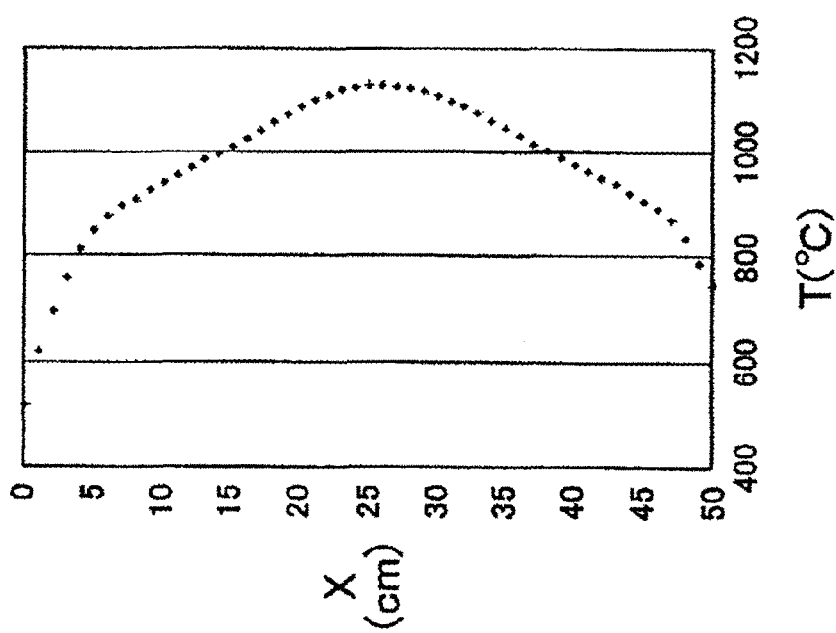

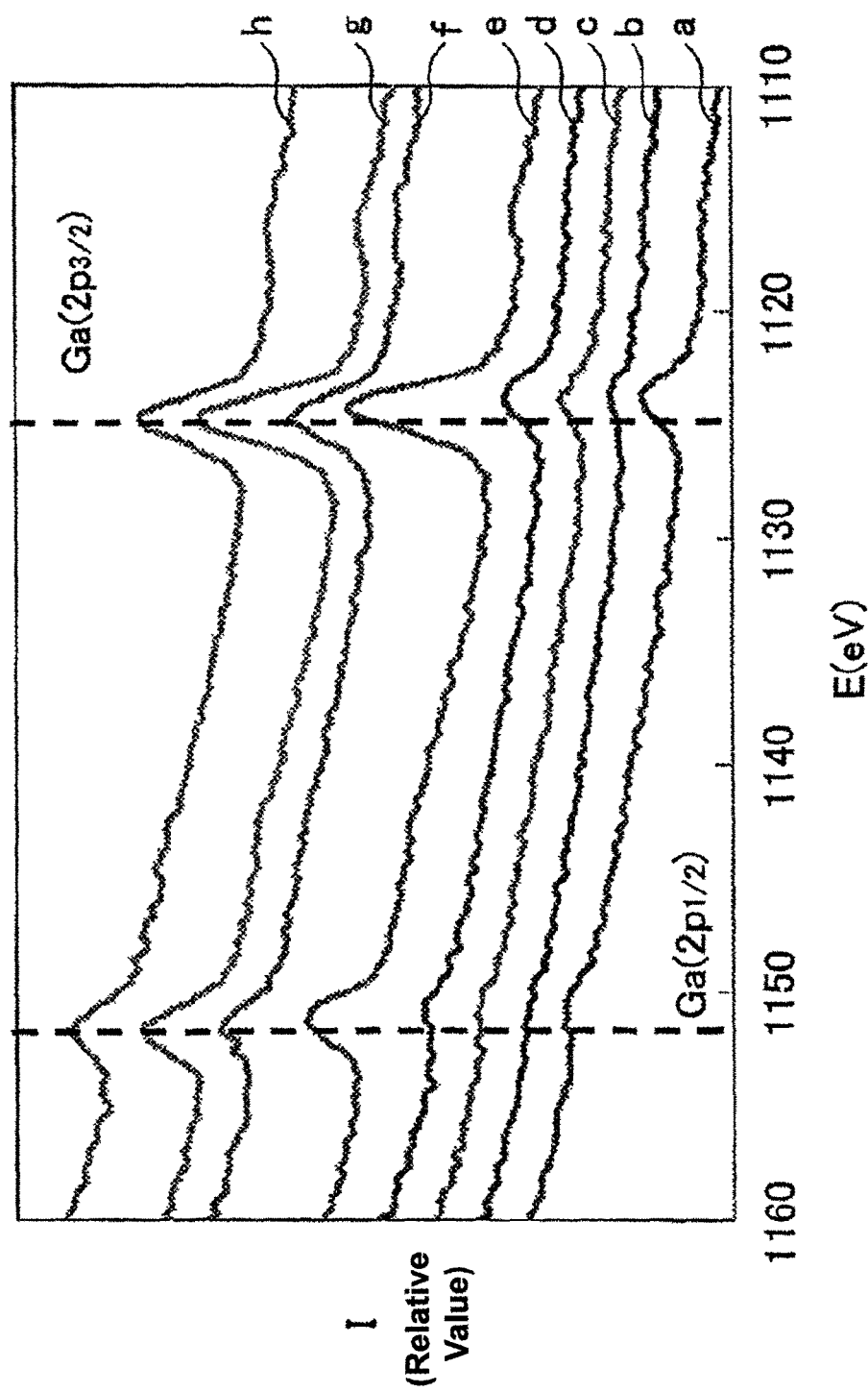

METHOD FOR CONCENTRATING METAL COMPOUND BY REDUCTION AND OXIDATION

TECHNICAL FIELD

The present invention relates to a method for concentrating a metal compound, more particularly relates to a method for concentrating a metal compound which raises the concentration of the individual compounds from a mixture of metal compounds of gallium, indium, germanium, tellurium, and cesium.

BACKGROUND ART

Gallium is an important element which is used in a CIGS-type thin film solar panel or light emitting diode (LED) etc.

Gallium is widely distributed in the earth's crust, but there is no ore which richly contains gallium. A Bayer process which will be explained below is general as an industrial manufacturing method.

As a method for obtaining gallium from a Bayer solution, for example, there is known a method of coprecipitating gallium and aluminum by blowing carbon dioxide into a Bayer solution to obtain a concentrate of gallium, dissolving this in a sodium hydroxide, and electrolyzing this to obtain metal gallium. Further, there is known a method of directly electrolyzing a Bayer solution by using a mercury electrode to obtain gallium as an amalgam.

For example, NPLT 1 discloses a method of directly electrodepositing gallium from a Bayer solution.

Further, for example, in a step of manufacturing Bauxite from an ore extracted from mines or manufacturing aluminum, zinc, tin, or another metal or compound from sphalerite or cassiterite etc., a byproduct which contains gallium is frequently generated. For this reason, collection of gallium using the above byproduct as a natural resource has been studied.

For example, a method of separation and concentration of the gallium which is contained in a stannic chloride is disclosed in PLT 1.

The method which is disclosed in PLT 1 is a wet process, therefore there is the disadvantage that a large amount of waste liquid is generated when a large amount of ore is processed.

Further, for example, a method of collecting metal gallium from an oxide which contains gallium by a dry process is disclosed in PLT 2.

PLT 3 proposes a technique of recovering gallium from waste which contains gallium.

The methods disclosed in PLTs 2 and 3 are dry processes, therefore have no demerit such as generation of a large amount of waste liquid as in the method disclosed in PLT 1. However, the method disclosed in PLT 2 tries to obtain gallium having a further higher purity from a mixture or compound which already has a considerably high gallium concentration and is quite different from the technique of the present invention for concentrating the gallium up to a certain concentration from an ore which contains a minute amount of gallium. In the method disclosed in PLT 3, chlorine is added as an element causing chlorination. Poisonous chlorine gas must be removed from exhaust gas, therefore there is a problem in terms of the apparatus.

Further, PLTs 4 and 5 disclose methods of generating highly concentrated gallium oxide from metal gallium.

It is expected that the supply of gallium become increasingly insufficient in the future, therefore it has been demanded to develop a technique for separating or concentrating gallium from a mixture which contains a minute amount of gallium such as an ore extracted from a mine or used electronic components. A similar situation exists for indium as well, therefore it has been demanded to develop a technique of separating or concentrating indium from a mixture which contains a minute amount of indium.

PLT 6 discloses a method and apparatus for treating radioactive waste which heat radioactive waste which contains a volatile radioactive substance to vaporize and separate the radioactive substance.

PLT 7 discloses a method of treatment of spent fuel which recovers uranium from spent fuel which contains uranium nitride as a principal ingredient in a form of a nitride.

PLT 8 discloses a method of vacuum melting a tellurium material to produce highly pure tellurium.

PLT 9 discloses a method for recovering valuable substances from scrap alloy by sublimating and collecting at least one type of metal element among the elements which are contained in scrap alloy as a metal oxide and separating this from the remaining metal elements.

PLT 10 discloses a method and apparatus for recovering germanium which brings a germanium-containing solid and hydrogen chloride into contact to generate germanium tetrachloride.

CITATION LIST

Patent Literature

PLT 1: Japanese Patent Publication No. 53-103998A
PLT 2: Japanese Patent Publication No. 2002-348622A
PLT 3: Japanese Patent Publication No. 64-75633A
PLT 4: Japanese Patent Publication No. 51-126997A
PLT 5: Japanese Patent Publication No. 50-119795A
PLT 6: Japanese Patent Publication No. 10-206594A
PLT 7: Japanese Patent Publication No. 11-248880A
PLT 8: Japanese Patent Publication No. 10-324933A
PLT 9: Japanese Patent Publication No. 61-6101A
PLT 10: Japanese Patent Publication No. 2001-58823A

Nonpatent Literature

NPLT 1: Trial of Direct Electrodeposition of Gallium on Gallium Electrode in Bayer Solution, Hirofumi Mizuno et al., Bulletin of the Faculty of Engineering, Hokkaido University, No. 152 (1990), p. 31 to 46

SUMMARY OF INVENTION

Technical Problem

The problem to be solved resides in the difficulty of concentration of gallium up to a certain concentration, which is collected from a mixture which contains a minute amount of gallium like an ore which is extracted from mines or used electronic components while suppressing the quantity of waste liquid generated.

The above problem is not limited to gallium. It is also difficult to concentrate elements up to certain concentrations from a mixture which contains a minute amount of indium, germanium, tellurium, cesium, or another element.

Solution to Problem

A method for concentrating a metal compound of the present invention comprises a step of reducing a first solid metal compound which contains a metal selected from a group consisting of gallium, indium, germanium, tellurium, and cesium at a first metal content in a mixture of the first solid metal compound to form a gaseous metal compound and a step of oxidizing the gaseous metal compound to form a second solid metal compound and collecting the second solid metal compound at a second metal content which is higher than the first metal content.

The method for concentrating the metal compound of the present invention described above reduces a first solid metal compound which contains a metal selected from a group consisting of gallium, indium, germanium, tellurium, and cesium at a first metal content in a mixture of the first solid metal compound to form a gaseous metal compound, and oxidizes the gaseous metal compound to form a second solid metal compound and collect the second solid metal compound at a second metal content which is higher than the first metal content.

The method for concentrating the metal compound of the present invention described above preferably performs the step of reducing the first solid metal compound to form the gaseous metal compound in an evaporating section, further comprises a step of transferring the gaseous metal compound from the evaporating section to a collecting section, and performs the step of oxidizing the gaseous metal compound to form the second solid metal compound in the collecting section.

The method for concentrating the metal compound of the present invention described above preferably, in the step of reducing the first solid metal compound to form the gaseous metal compound, reduces the first solid metal compound in a mixture of the first solid metal compound with a solid reducing agent, in a reducing gas atmosphere, or in a mixture of the first solid metal compound with the solid reducing agent in a reducing gas atmosphere to form the gaseous metal compound.

The method for concentrating the metal compound of the present invention described above preferably, in the step of reducing the first solid metal compound to form the gaseous metal compound, heats the mixture of the first solid metal compound.

The method for concentrating the metal compound of the present invention described above preferably is one wherein the metal is gallium and which, in the step of reducing the first solid metal compound to form the gaseous metal compound, heats the mixture of the first solid metal compound to 900° C. or more.

The method for concentrating the metal compound of the present invention described above preferably, in the step of reducing the first solid metal compound to form the gaseous metal compound, reduces the first solid metal compound to form gaseous $Ga_2O$ and, in the step of oxidizing the gaseous metal compound to form the second solid metal compound, oxidizes the gaseous $Ga_2O$ to form solid $Ga_2O_3$.

The method for concentrating the metal compound of the present invention described above, preferably, is one where the metal is indium and which, in the step of reducing the first solid metal compound to form the gaseous metal compound, heats the mixture of the first solid metal compound to 600° C. or more.

The method for concentrating the metal compound of the present invention described above preferably, in the step of reducing the first solid metal compound to form the gaseous metal compound, reduces the first solid metal compound to form gaseous $In_2O$ and, in the step of oxidizing the gaseous metal compound to form the second solid metal compound, oxidizes the gaseous $In_2O$ to form solid $In_2O_3$.

An apparatus for concentrating a metal compound of the present invention comprises a reaction tube, an evaporating section which is provided in the reaction tube, holds a mixture of a first solid metal compound which contains a metal selected from a group consisting of gallium, indium, germanium, tellurium, and cesium at a first metal content, and reduces the first solid metal compound by heating to form a gaseous metal compound, a collecting section which is provided in the reaction tube, to which the gaseous metal compound is transferred, and which oxidizes the gaseous metal compound to form a second solid metal compound to collect the second solid metal compound on a collecting substrate, and a heater which is provided on an outer circumference of the reaction tube, and heats the internal portion of the reaction tube so as to obtain a temperature profile to enable use of the evaporating section to reduce the first solid metal compound to form the gaseous metal compound and use of the collecting section to oxidize the gaseous metal compound to collect the second solid metal compound at a second metal content which is higher than the first metal content.

Advantageous Effect of Invention

According to the present invention, gallium can be easily concentrated up to a certain concentration from a mixture which contains a minute amount of gallium like an ore which is extracted from mines or used electronic components while suppressing the quantity of waste liquid generated.

Further, indium can be easily concentrated up to a certain concentration from a mixture which contains a minute amount of indium like an ore extracted from mines or used electronic components while suppressing the quantity of waste liquid generated.

BRIEF DESCRIPTION OF DRAWINGS

FIGS. 6A and 6B are graphs showing temperature profiles with respect to the positions of a reaction tube according to the first example of the present invention.

FIG. 7 is a spectrum of X-ray photoelectron spectroscopy (XPS) according to the first example of the present invention.

DESCRIPTION OF EMBODIMENTS

Embodiments of an apparatus for concentration of a metal compound of the present invention illustrated by a method of concentration of a gallium compound will be explained with reference to the drawings.

First Embodiment

Constitution of Apparatus for Concentration of Gallium Compound

Figure 1:
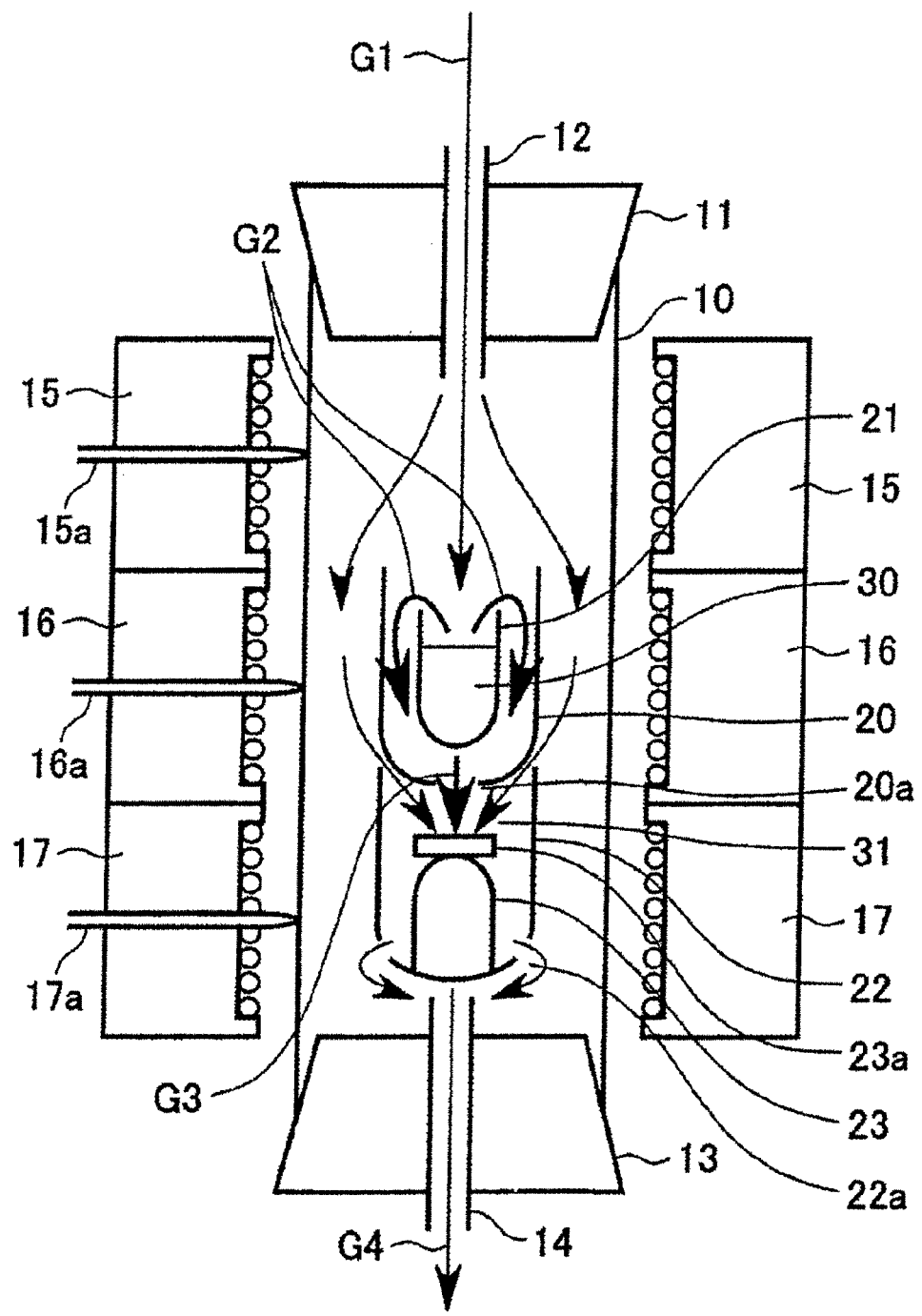
FIG. 1 is a schematic view of the configuration of an apparatus for concentration of a metal compound according to a first embodiment of the present invention.

FIG. 1 is a schematic view of the configuration of an apparatus for concentration of a gallium compound of an element according to the present embodiment.

For example, an upper opening of a reaction tube 10 is closed by an upper cap 11, and an upper glass tube is provided which penetrates through the upper cap 11. For example, a lower opening of the reaction tube 10 is closed by a lower cap 13, and a lower glass tube 14 is provided which penetrates through the lower cap 13.

For example, on the outer circumference of the reaction tube 10, provision is made of a first heater 15, second heater 16, and third heater 17 which can be individually temperature controlled and heat the reaction tube 10 so that the internal portion becomes a predetermined temperature profile. Further, provision is made of a first thermocouple 15a, second thermocouple 16a, and third thermocouple 17a which monitor for example the temperature at the side surface of the reaction tube 10. Here, three thermocouples are shown as a representative case, but a larger number of thermocouples may be provided as well.

For example, inside the reaction tube 10, an evaporated gas induction pipe constituted by a first Tammann tube 20 is provided. The upper end of the first Tammann tube 20 is opened and is communicated with a space inside the reaction tube 10. Further, a lower end of the first Tammann tube 20 is closed, but a nozzle 20a is opened in the bottom of the first Tammann tube 20.

For example, a second Tammann tube 21 is provided inside the first Tammann tube 20. The upper end of the second Tammann tube 21 is opened and is communicated with the space inside the first Tammann tube 20. The lower end of the second Tammann tube 21 is closed.

For example, in a lower part of the nozzle 20a portion of the first Tammann tube 20, a third Tammann tube 22 is provided with a predetermined gap with the first Tammann tube 20. The upper end of the third Tammann tube 22 is opened and is communicated with the space inside the reaction tube 10. Further, the lower end of the third Tammann tube 22 is closed, but a Tammann tube exhaust port 22a is opened in the vicinity of the bottom of the third Tammann tube 22.

For example, inside the third Tammann tube 22, a substrate stand 23 formed by a Tammann tube is provided. On the substrate stand 23, an alumina substrate or another collecting substrate 23a is held. As the material constituting the collecting substrate 23a, for the reason which will be explained later, use can be also made of stabilized zirconia, gadolinium-doped ceria, ceria-zirconia solid solution, and so on.

Inside the second Tammann tube 21 having the above constitution, a mixture of a solid gallium compound at a first gallium content is held. When it is heated up to a predetermined temperature by the first heater 15, second heater 16, and third heater 17, the solid gallium compound in the mixture of the solid gallium compound is reduced, and a gaseous gallium compound is generated. The internal portion of the second Tammann tube 21 will be referred to as an evaporating section 30.

Further, the above generated gaseous gallium compound is oxidized in the vicinity of the collecting substrate 23a whereby a solid gallium compound is generated. The generated solid gallium compound is collected onto the collecting substrate 23a. The vicinity of the collecting substrate 23a will be referred to as a collecting section 31.

Method of Concentration of Gallium Compound

Using the apparatus for concentration of a gallium compound having the constitution in FIG. 1, a gallium compound is concentrated in the following way.

For example, a mixture of the first solid gallium compound at the first gallium content is held inside the second Tammann tube 21. As the mixture of the first solid gallium compound, use can be made of for example a mixture of an ore extracted from mines or used electronic components.

Further, for example, from the upper glass tube 12, nitrogen ($N_2$) or another carrier gas G1 is made to flow in at a predetermined flow rate. The carrier gas G1 flows inside and outside the first Tammann tube 20.

Here, for example, the mixture of the first solid gallium compound is made a mixture of the first solid gallium compound and a solid reducing agent.

Alternatively, a reducing gas is mixed with the above carrier gas G1 to form a reducing gas atmosphere inside the reaction tube 10.

Alternatively, the mixture of the first solid gallium compound is made a mixture of the first solid gallium compound and a solid reducing agent, and further a reducing gas is mixed with the above carrier gas G1 to form a reducing gas atmosphere inside the reaction tube 10.

As the above solid reducing agent, use can be made of for example activated carbon or graphite or another carbon, scrap wood, scrap plastic, and so on.

Further, as the reducing gas, for example, use can be made of hydrogen, carbon monoxide, petroleum waste gas, scrap wood waste gas, and waste gas of scrap plastics etc.

In the present embodiment described below, an explanation will be given by using activated carbon as a representative of the reducing agent. However, the invention not limited to this, and a solid reducing agent other than the above activated carbon or reducing gas or both of them can be used.

Here, for example, the first heater 15, second heater 16, and third heater 17 are used to heat the internal portion of the second Tammann tube 21 so as to become a predetermined temperature profile. By heating, in the evaporating section 30, the first solid gallium compound is reduced in the mixture of the first solid gallium compound and the solid reducing agent, in the reducing gas atmosphere, or in the mixture of the first gallium compound and the solid reducing agent in the reducing gas atmosphere whereby an evaporated gas G2 of the gaseous gallium compound is generated. A mixed gas G3 which contains gallium which is comprised of the carrier gas G1 and the evaporated gas G2 is transferred from the nozzle 20a to the collecting section 31.

In the above reaction in which the solid gallium compound is reduced and the gaseous gallium compound is generated, for example, as shown in the following Chemical Formula (1), the first solid gallium compound $Ga_2O_3$ reacts with the reducing agent activated carbon (C) whereby the gaseous gallium compound $Ga_2O$ and carbon monoxide (CO) are generated.

For example, in the collecting section 31, the mixed gas G3 which contains gallium is transferred from the nozzle 20a, and the carrier gas G1 flows in from the gap between the first Tammann tube 20 and the third Tammann tube 22. The gaseous gallium compound in the mixed gas G3 which contains gallium is oxidized to form the second solid gallium compound, and the second solid gallium compound is collected on the collecting substrate 23a at a second gallium content which is higher than the first gallium content.

In the reaction in which the gaseous gallium compound is oxidized and the second solid gallium compound is generated described above, for example, as shown in the following Chemical Formula (2), the gaseous gallium compound $Ga_2O$ reacts with the oxygen ($O_2$), water vapor, or another oxidizing gas contained in the mixed gas G3 which contains gallium or carrier gas G1 whereby the second solid gallium compound $Ga_2O_3$ is generated.

In the reactions shown in Chemical Formulas (1) and (2), the first solid gallium compound and the second solid gallium compound are $Ga_2O_3$ having the same composition, but may be gallium compounds having compositions which are different from each other as well.

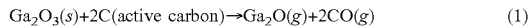

$$Ga_2O_3(s)+2C(\text{active carbon})\rightarrow Ga_2O(g)+2CO(g) \quad (1)$$

$$Ga_2O(g)+O_2(g)\rightarrow Ga_2O_3(s) \quad (2)$$

In the method of concentration of a gallium compound of the present embodiment described above, in the step of reducing the first solid gallium compound to form the gaseous gallium compound, preferably the mixture of the first solid gallium compound is heated so as to become 900° C. or more.

Here, the step (evaporating section 30) of reducing the first solid gallium compound to form the gaseous gallium compound is performed under a conditions of a temperature and oxygen partial pressure by which for example a vapor pressure of the gallium compound generated by reduction becomes $10^{-2}$ atm (1 kPa) or more.

If the temperature is less than 900° C., there is possibility that the reduction reaction shown by the above Chemical Formula (1) will not sufficiently advance.

According to a thermodynamic calculation, in the reaction of Chemical Formula (1) described above, the temperature at which the $Ga_2O$ is generated becomes 900° C. or more.

Further, the step (collecting section 31) of oxidizing the gaseous gallium compound to form the second solid gallium compound is performed under conditions to give a temperature and oxygen partial pressure by which for example the vapor pressure of the gallium compound generated by oxidation becomes 1/10 or less of the vapor pressure of the gallium compound in the evaporating section.

In order to heat the mixture of the first solid gallium compound so as to become 900° C. or more as described above, for example, in the apparatus for concentration of the gallium compound having the constitution in FIG. 1, the first heater is turned off (no heating), the second heater is set at 1150° C., and the third heater is set at 800 to 1150° C.

In order to suppress deterioration of the electric furnace, the upper limit of the set temperature of each heater is determined to about 1150° C. However, the temperature can be raised more than this so far as the heat resistance of the reaction tube is high.

Further, when the heating temperature is made high, a silicon ingredient of gas (SiO(g) etc.) is generated as well, therefore a possibility of collection of the silicon compound becomes high. Therefore, preferably the temperature is set to an extent where a silicon ingredient is not generated.

The carbon monoxide (CO) described above, unreacted component of the mixed gas G3 which contains gallium, and carrier gas G1 are discharged as an exhaust gas G4 from the lower glass tube 14 through the Tammann tube exhaust port 22a.

As explained above, the method of concentration of the gallium compound of the present embodiment mixes the reducing agent activated carbon with the raw material which contains a minute amount of gallium and reduces this at a high temperature to thereby separate the $Ga_2O(g)$ vapor of the gallium component and oxidizes and collects this as $Ga_2O_3(s)$.

The conventional methods for collecting gallium from a Bayer solution are all wet processes which use solutions. However, the method of concentration of gallium compound of the present embodiment is dry refining which does not use a solution and accordingly does not generate a waste liquid.

In the present embodiment, it is possible to suppress the quantity of waste liquid generated and concentrate gallium from an ore extracted from mines or used electronic components.

The gallium can be separated and collected at a high content that exceeds the easily industrially utilized 5 wt % from a gallium mixture at a low content of a concentration of about 10 to 1000 ppm which has not been studied heretofore for industrial utilization.

The method disclosed in PLT 2 is an invention of recovery of metal gallium. It is necessary to maintain an oxygen partial pressure low enough to stabilize the metal gallium in a lower trap for recovering gallium. For this purpose, a clever device design achieving a perfect seal without leakage in the upper and lower traps is indispensable. This may become a big obstacle in practical use.

On the other hand, the present embodiment greatly differs in the point of utilization of a high vapor pressure of gallium oxide (mainly $Ga_2O$) under a low oxygen atmosphere. Accordingly, first, it is not necessary to maintain a low oxygen partial pressure so that the metal gallium is stabilized around the evaporating section. Further, the oxidation atmosphere is formed in the gallium collecting section. Accordingly, no obstacle inpractical use occurs as described above.

Further, in the method of PLT 2, recovery of gallium from an oxide which contains gallium is attempted by utilizing reduction to metal gallium, therefore it is necessary that the oxide which contains gallium "substantially not contain an element having a high free energy for generating an oxide".

On the other hand, the present embodiment greatly differs in the point that a high vapor pressure of the gallium oxide (mainly $Ga_2O$) under a low oxygen atmosphere is utilized. Accordingly, even when an "element having a high free energy for generating an oxide" like Fe is contained, it can be recovered. Further, as shown in the embodiment which will be explained later, it was possible to successfully concentrate a gallium compound in an ore I which contains 8.87 wt % of $Fe_2O_3$.

In the method of PLT 3, chlorine is added as causing chlorination. In a process using chlorine, it is necessary to remove the poisonous chlorine gas from the exhaust gas. Further, serious corrosion of parts of the apparatus due to chlorine becomes a problem in hardware design. Therefore, in the embodiments, use is made of a vessel made of quartz which is excellent in corrosion resistance.

Further, in the method of PLT 3, chloride having a high boiling point remains in a chlorination vessel, therefore a process of filtering these is necessary as well.

On the other hand, the present embodiment greatly differs in the point that a high vapor pressure of gallium oxide (mainly $Ga_2O$) under a low oxygen atmosphere is utilized to recover this as the oxide $Ga_2O_3$. Accordingly, there is no obstacle in practical use as described above.

Further, in the methods of generating highly concentrated gallium oxide from metal gallium in PLTs 4 and 5, the raw material must be metal gallium, therefore the methods cannot be applied to the concentration of a gallium compound as in the present embodiment.

The present embodiment can be applied to concentration from a minute amount of gallium compound of for example about 50 ppm (0.005 wt %).

As described above, according to the present embodiment, it is possible to suppress the disadvantages of the prior art described above and easily concentrate gallium up to a certain concentration from a mixture which contains a minute amount of gallium like an ore extracted from mines or used electronic components while suppressing the quantity of waste liquid generated.

For example, it is also possible to concentrate the gallium compound up to a certain extent of concentration according to the present embodiment and further concentrate the obtained product according to the methods of PLTs 1 to 3.

The collecting substrate 23a in the apparatus for concentration of gallium compound shown in FIG. 1 is preferably constituted by an oxide ion conducting material or a material having an oxygen storage capability since the reaction of Chemical Formula (2) described above is promoted.

In the case of the material having the oxide ion conductivity, by movement of the oxide ions in the collecting substrate 23a, oxygen can be supplied to the collection surface of the collecting substrate 23a. Further, in the case of a material having an oxygen storage capability, oxygen stored in the collecting substrate 23a can be supplied to the collection surface.

As the oxide ion conducting material or material having the oxygen storage capability, there can be mentioned for example stabilized zirconia, gadolinium-doped ceria, a ceria-zirconia solid solution, and so on.

In the present embodiment described above, the method and apparatus for concentrating the gallium compound by the reactions shown by Chemical Formulas (1) and (2) described above were explained. However, the invention is not limited to a gallium compound. It can also be applied to a compound of a metal element capable of a chemical reaction which, in a mixture of a first solid metal compound which contains metal at a first metal content, reduces the first solid metal compound to obtain a gaseous metal compound and oxidizes the obtained gaseous metal compound to obtain a second solid metal compound. Specifically, it can be applied to compounds of indium, germanium, tellurium, and cesium other than gallium.

That is, the method of concentration of the metal compound according to the present embodiment takes a mixture of a first solid metal compound which contains a metal selected from a group consisting of gallium, indium, germanium, tellurium, and cesium at a first metal content, reduces the first solid metal compound to form the gaseous metal compound, oxidizes the obtained gaseous metal compound to form a second solid metal compound, and collects the second solid metal compound at a second metal content which is higher than the first metal content.

In the method and apparatus for concentrating an indium compound, for example, as shown by the following Chemical Formula (3), the first solid indium compound $In_2O_3$ reacts with a reducing agent activated carbon (C) to generate a gaseous indium compound $In_2O$ and carbon monoxide (CO) and further, as shown by the following Chemical Formula (4), the gaseous indium compound $In_2O$ reacts with oxygen ($O_2$) or another oxidizing gas to generate the second solid indium compound $In_2O_3$.

$$In_2O_3(s)+2C(\text{active carbon})\rightarrow In_2O(g)+2CO(g) \quad (3)$$

$$In_2O(g)+O_2(g)\rightarrow In_2O_3(s) \quad (4)$$

In the step (evaporating section 30) of reducing the first solid indium compound to form the gaseous gallium compound, according to thermodynamic calculation, in the reaction of Chemical Formula (3) described above, the temperature at which $In_2O$ is generated becomes 700° C. or more.

In the method and apparatus for concentrating a germanium compound, as shown by for example the following Chemical Formula (5), a first solid germanium compound $GeO_2$ reacts with a reducing agent activated carbon (C) to generate a gaseous germanium compound GeO and carbon monoxide (CO) and further, as shown by the following Chemical Formula (6), the gaseous germanium compound GeO reacts with oxygen ($O_2$) or another oxidizing gas to generate a second solid germanium compound $GeO_2$.

$$GeO_2(s)+C(\text{active carbon})\rightarrow GeO(g)+CO(g) \quad (5)$$

$$GeO(g)+\tfrac{1}{2}O_2(g)\rightarrow GeO_2(s) \quad (6)$$

In the step (evaporating section 30) of reducing the first solid germanium compound to form the gaseous germanium compound, according to thermodynamic calculation, in the reaction of Chemical Formula (5) described above, the temperature at which GeO is generated becomes 700° C. or more.

In a method and apparatus for concentrating a tellurium compound, for example, as shown by the following Chemical Formula (7), a first solid tellurium compound $TeO_2$ reacts with the reducing agent activated carbon (C) to generate a gaseous tellurium compound $Te_2O_2$ and carbon monoxide (CO), and further, as shown by the following Chemical Formula (8), the gaseous tellurium compound $Te_2O_2$ reacts with oxygen ($O_2$) or another oxidizing gas to generate a second solid tellurium compound $TeO_2$.

$$2TeO_2(s)+2C(\text{active carbon})\rightarrow Te_2O_2(g)+2CO(g) \quad (7)$$

$$Te_2O_2(g)+O_2(g)\rightarrow 2TeO_2(s) \quad (8)$$

In the step (evaporating section 30) of reducing the first solid tellurium compound to form the gaseous tellurium compound, according to thermodynamic calculation, in the reaction of Chemical Formula (7) described above, the temperature at which $Te_2O_2$ is generated becomes 200° C. or more.

In a method and apparatus for concentrating a cesium compound, as shown by for example the following Chemical Formula (9), a first solid cesium compound $Cs_2O_3$ reacts with the reducing agent activated carbon (C) to generate a gaseous cesium compound $Cs_2O$ and carbon monoxide (CO) and further, as shown by the following Chemical Formula (10), the gaseous cesium compound $Cs_2O$ reacts with oxygen ($O_2$) or another oxidizing gas to generate a second solid cesium compound $Cs_2O_3$.

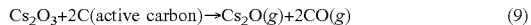

$$Cs_2O_3 + 2C(\text{active carbon}) \rightarrow Cs_2O(g) + 2CO(g) \quad (9)$$

$$Cs_2O(g) + O_2(g) \rightarrow Cs_2O_3(s) \quad (10)$$

In the step (evaporating section 30) of reducing the first solid cesium compound to form the gaseous cesium compound, according to thermodynamic calculation, in the reaction of Chemical Formula (9) described above, the temperature at which $Cs_2O$ is generated becomes the room temperature or more.

In the case of application to compounds of indium, germanium, tellurium, and cesium, other than what is described above, the processing can be carried out in the same way as the explanation for the method and apparatus for concentrating a gallium compound in the present embodiment.

Second Embodiment

Constitution of Apparatus for Concentration of Gallium Compound

Figure 2:
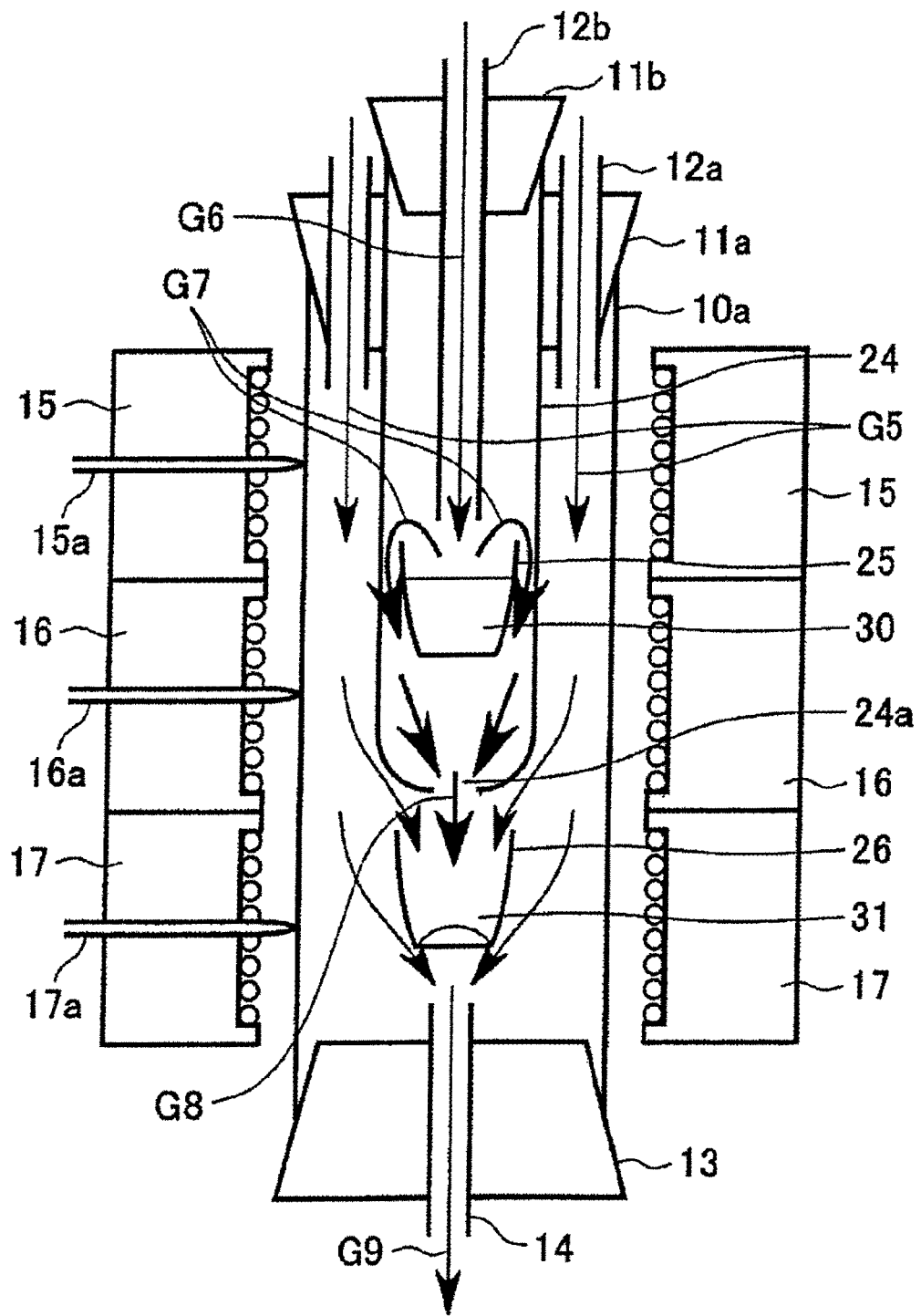
FIG. 2 is a schematic view of the configuration of an apparatus for concentration of a metal compound according to a second embodiment of the present invention.

FIG. 2 is a schematic view of the configuration of an apparatus for concentration of a gallium compound according to the present embodiment. For example, the upper opening of a first reaction tube 10a is closed by a first upper cap 11a, and a first upper glass tube 12a for introducing oxidizing gas is provided which penetrates through the first upper cap 11a. Further, a second reaction tube 24 is provided so as to penetrate through the first upper cap 11a. The upper opening of the second reaction tube 24 is closed by a second upper cap 11b, and a second upper glass tube 12b for introducing carrier gas is provided which penetrates through the second upper cap 11b.

For example, the lower opening of the first reaction tube 10a is closed by a lower cap 13, and a lower glass tube 14 is provided which penetrates through the lower cap 11.

For example, on the outer circumference of the first reaction tube 10a, provision is made of the first heater 15, second heater 16, and third heater 17 capable of individual temperature control and which heat the second reaction tube 24 so that the internal portion becomes the desired temperature profile. Further, provision is made of the first thermocouple 15a, second thermocouple 16a, and third thermocouple 17a monitoring the temperature at for example the side surface of the first reaction tube 10a.

For example, the lower end of the second reaction tube 24 is closed, but the nozzle 24a is opened at the bottom of the second reaction tube 24. Further, for example, inside the second reaction tube 24, a first melting pot 25 is provided.

For example, in the lower part of the nozzle 24a portion of the second reaction tube 24, a second melting pot 26 is provided with a predetermined gap from the second reaction tube 24. The upper end of the second melting pot 26 is opened and is communicated with the space inside the first reaction tube 10a.

Inside the first melting pot 25 having the above constitution, a mixture of a first solid gallium compound having a first gallium content is accommodated. When it is heated to a predetermined temperature by the first heater 15, second heater 16, and third heater 17, the first solid gallium compound in the mixture of first solid gallium compound is reduced, and a gaseous gallium compound is generated. The internal portion of the first melting pot 25 will be referred to as the "evaporating section 30".

Further, the gaseous gallium compound generated as described above is oxidized in the second melting pot 26 to generate a second solid gallium compound, and the generated second solid gallium compound is collected in the second melting pot 26. The inside of the second melting pot 26 will be referred to as the "collecting section 31".

Method of Concentration of Gallium Compound

Using the apparatus for concentration of a gallium compound having the constitution in FIG. 2, the gallium compound is concentrated as in the following way. For example, the mixture of the first solid gallium compound at the first gallium content is accommodated inside the first melting pot 25. As the mixture of the first solid gallium compound, use can be made of for example a mixture of an ore extracted from mines or used electronic components with the reducing agent activated carbon or other carbon.

Further, for example, from the first upper glass tube 12a, a mixed gas G5 of nitrogen ($N_2$) or another carrier gas with oxygen ($O_2$) is made to flow in at a predetermined flow rate.

Further, for example, from the second upper glass tube 12b, a mixed gas G6 of nitrogen ($N_2$) or another carrier gas with gaseous water ($H_2O$) is made to flow in at a predetermined flow rate.

Here, for example, the mixture of the first solid gallium compound is made a mixture of the first solid gallium compound and a solid reducing agent.

Alternatively, the reducing gas is mixed with the above mixed gas G5 or mixed gas G6 etc. to make the inside of the second reaction tube 24 a reducing gas atmosphere.

Alternatively, the mixture of the first solid gallium compound is made a mixture of the first solid gallium compound with a solid reducing agent and further a reducing gas is mixed with the above mixed gas G5 or mixed gas G6 etc. to make the inside of the second reaction tube 24 a reducing gas atmosphere.

As the above solid reducing agent, for example, use can be made of activated carbon or graphite or another carbon, scrap wood, scrap plastic, and so on.

Further, as the reducing gas, for example, use can be made of hydrogen, carbon monoxide, petroleum waste gas, scrap wood waste gas, and waste gas of scrap plastic etc.

In the present embodiment described below, an explanation will be given by using activated carbon as representative of a reducing agent. However, the invention is not limited to this, and use can be made of a solid reducing agent other than the above activated carbon or reducing gas or both of them.

Here, for example, the first heater 15, second heater 16, and third heater 17 are used to heat the internal portion of the first melting pot 25 so as to give a predetermined temperature profile. By heating, in the evaporating section 30, the solid gallium compound in the mixture of the first solid gallium compound at the first gallium content is reduced, and a gaseous gallium compound evaporated gas G7 is generated. A mixed gas G8 of the mixed gas G6 and the evaporated gas G7 is transferred from the nozzle 24a to the collecting section 31.

In a reaction where the first solid gallium compound is reduced to generate the gaseous gallium compound described above, for example, as shown by the above Chemical Formula (1), the solid gallium compound $Ga_2O_3$ reacts with the reducing agent activated carbon (C), and thus the gaseous gallium compound $Ga_2O$ and carbon monoxide (CO) are generated.

For example, in the collecting section 31, the mixed gas which contains gallium G8 is transferred from the nozzle 24a, and the mixed gas G5 flows in from a gap between the second reaction tube 24 and the second melting pot 26. The gaseous gallium compound in the mixed gas which contains gallium G8 is oxidized to form the second solid gallium compound, and the second solid gallium compound is collected in the second melting pot 26 at a second gallium content which is higher than the first gallium content.

In a reaction where the gaseous gallium compound is oxidized to generate the second solid gallium compound described above, for example, as shown by the above Chemical Formula (2), the gaseous gallium compound $Ga_2O$ reacts with oxygen ($O_2$) contained in the mixed gas G5, and thus the solid gallium compound $Ga_2O_3$ is generated.

In the reactions shown by Chemical Formulas (1) and (2), the first solid gallium compound and the second solid gallium compound are $Ga_2O_3$ having the same composition. However, they may be gallium compounds which have compositions different from each other as well.

In the method of concentration of gallium compound of the present embodiment described above, in the step of reducing the first solid gallium compound to form the gaseous gallium compound, preferably the mixture of the first solid gallium compound is heated so as to become 900° C. or more.

When it is less than 900° C., there is a possibility that the reduction reaction shown by the above Chemical Formula (1) will not sufficiently advance.

The above carbon monoxide (CO), unreacted component of mixed gas which contains gallium G8, and mixed gas G5 are discharged from the lower glass tube 14 as an exhaust gas G9.

As explained above, in the method of concentration of a gallium compound of the present embodiment, by mixing the reducing agent carbon with the raw material which contains a minute amount of gallium and reducing this at a high temperature, $Ga_2O(g)$ vapor of the gallium component is separated, and this is oxidized and is collected as $Ga_2O_3(s)$.

The conventional methods of collection of gallium from the Bayer solution are all wet processes which use solutions. However, the present embodiment does not use a solution.

Accordingly, this is dry refining without generation of waste liquid. From the above description, in the present embodiment, it is possible to suppress the quantity of waste liquid generated and concentrate gallium from an ore extracted from mines or used electronic components.

The gallium can be separated and collected at a high content that exceeds the easily industrially utilized 5 wt % from a gallium mixture at a low content of a concentration of about 10 to 1000 ppm which has not been studied heretofore for industrial utilization.

As described above, according to the present invention, gallium can be easily concentrated up to a certain concentration from a mixture which contains a minute amount of gallium like an ore which is extracted from mines or used electronic components while suppressing the quantity of waste liquid generated and thereby suppressing the disadvantages of the prior art described above.

For example, it is also possible to concentrate the gallium compound up to a certain extent of concentration according to the present embodiment and further concentrate the obtained product according to the methods of PLTs 1 to 3.

Except for the above description, this embodiment is the same as the first embodiment.

In the present embodiment described above, the method and apparatus for concentrating the gallium compound were explained. However, the invention is not limited to a gallium compound. In the same way as the first embodiment, it can be applied to compounds of indium, germanium, tellurium, and cesium.

Third Embodiment

Figure 3:
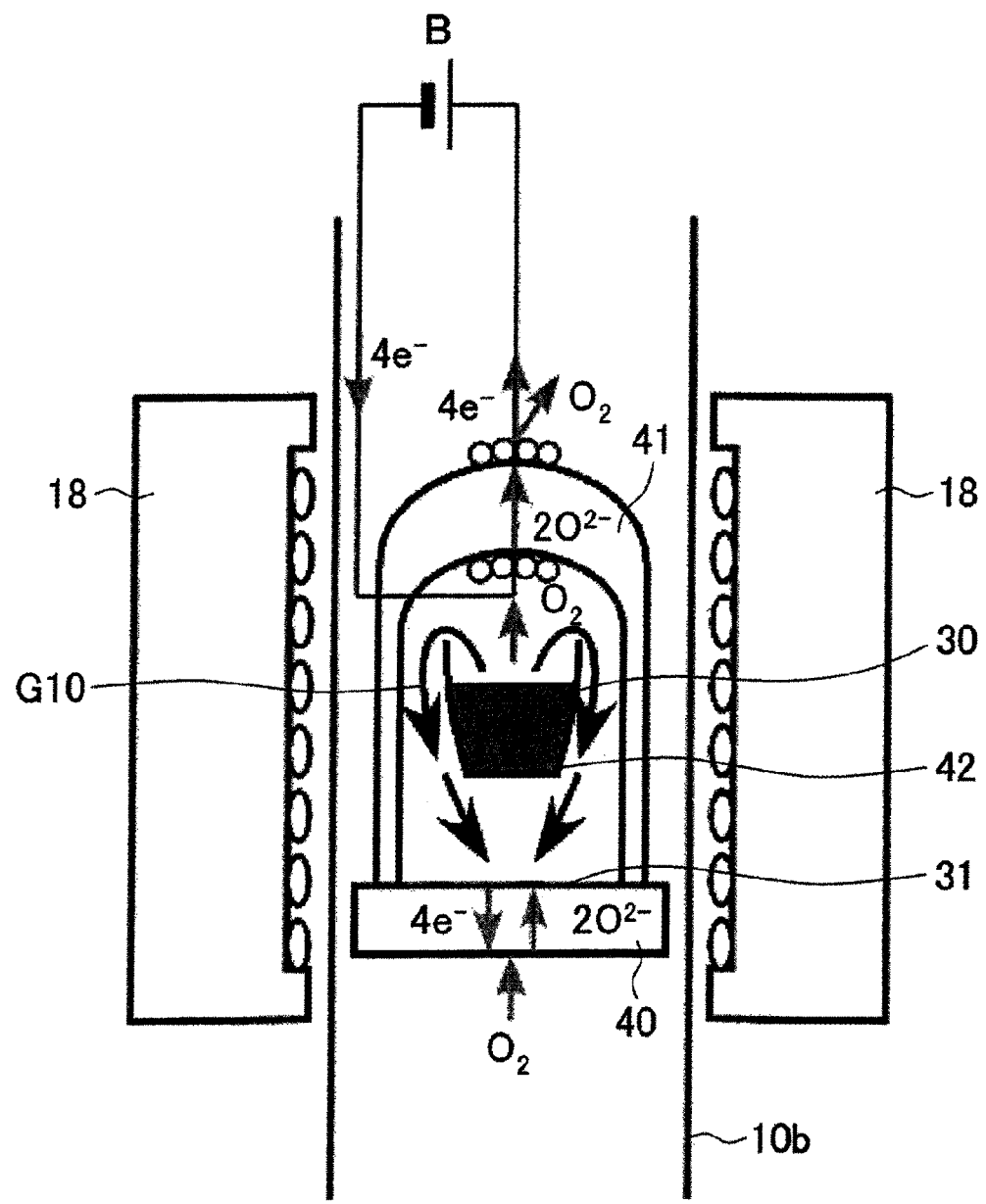
FIG. 3 is a schematic view of the configuration of an apparatus for concentration of a metal compound according to a third embodiment of the present invention.

Constitution of Apparatus for Concentration of Gallium Compound and Method of Concentration FIG. 3 is a schematic view of the configuration of an apparatus for concentration of a gallium compound according to the present embodiment. For example, inside a first reaction tube 10b, on a flat plate-shaped collecting substrate 40, a second reaction tube 41 having an opening provided in its lower part is provided arranged so that the opening is closed by the surface of the collecting substrate 40.

For example, the second reaction tube 41 is constituted by a material whereby the oxide ions are conducted through the internal portion of the second reaction tube 41 by connecting a cathode of an external DC power supply B to the external surface of the second reaction tube 41 and connecting an anode to the inner surface of the second reaction tube 41 and applying a voltage. When voltage is applied as described above, oxygen which had been at the internal portion in the vicinity of the upper end of the second reaction tube 41 becomes oxide ions which are conducted from the inner surface of the reaction tube 41 to the external surface, which becomes oxygen on the external surface in the vicinity of the upper end of the second reaction tube 41, and which is then released. That is, the second reaction tube 41 functions as an oxygen pump. Thus oxygen is removed from the internal portion in the vicinity of the upper end of the second reaction tube 41.

As the material for conduction of the oxide ions through the internal portion, use can be made of for example stabilized zirconia, apatite-type lanthanum silicates, and so on.

For example, the collecting substrate 40 is constituted by an oxygen permeable material or oxide ion-electron mixed conducting material.

The oxygen permeable material for example makes oxygen permeate from the surface of the collecting substrate 40 on the side opposite to the side where the second reaction tube 41 is provided to the surface on the side where the second reaction tube 41 is provided.

The oxide ion-electron mixed conducting material for example conducts the oxide ions from the surface of the collecting substrate 40 on the side opposite to the side where the second reaction tube 41 is provided to the surface on the side where the second reaction tube 41 is provided, conducts electrons from the surface of the collecting substrate 40 on the side where the second reaction tube 41 is provided to the surface on the side opposite to the side where the second reaction tube 41 is provided, mixes the oxide ions and electrons to make electrical conduction, and thereby substantially enables permeation of oxygen from the surface of the collecting substrate 40 on the side opposite to the side where the second reaction tube 41 is provided to the surface on the side where the second reaction tube 41 is provided.

As the oxygen permeable material or oxide ion-electron mixed conducting material, use can be made of for example a stabilized zirconia-metal composite material, porous material, or perovskite-type oxide.

For example, on the outer circumference of the first reaction tube 10b, a heater 18 is provided. The heater 18 may be configured so that a space surrounded by the second reaction tube 41 and the collecting substrate 40 is partitioned so as to obtain a desired temperature profile so that individual temperature control is possible. Further, for example a thermocouple for monitoring the temperature at the side surface of the second reaction tube 41 may be provided as well.

A melting pot 42 is provided in a space surrounded by the second reaction tube 41 and the collecting substrate 40.

Inside the melting pot 42 having the above constitution, the mixture of the first solid gallium compound at the first gallium content is accommodated.

By applying voltage to the second reaction tube 41 to make it function as an oxygen pump, removing oxygen which had been in the internal portion in the vicinity of the upper end of the second reaction tube 41 to form the reduction atmosphere, and heating this to a predetermined temperature by the heater 18, the first solid gallium compound in the mixture of the first solid gallium compound is reduced and the gaseous gallium compound is generated. The internal portion of the melting pot 42 will be referred to as the "evaporating section 30".

A gas G10 which contains the gaseous gallium compound generated described rides the stream of the gas generated due to a difference of concentration of the gaseous gallium compound and is transferred to the surface of the collecting substrate 40. The gaseous gallium compound is oxidized by oxygen which permeated through the collecting substrate 40 on the surface of the collecting substrate 40 to generate the second solid gallium compound, and the generated second solid gallium compound is collected onto the surface of the collecting substrate 40 at the second gallium content which is higher than the first gallium content. The surface of the collecting substrate 40 will be referred to as the "collecting section 31".

For example, the solid gallium compound $Ga_2O_3$ is reduced to generate the gaseous gallium compound $Ga_2O$, this is oxidized on the surface of the collecting substrate 40 to generate the solid gallium compound $Ga_2O_3$, and the result is collected.

As described above, according to the present embodiment, gallium can be easily concentrated up to a certain concentration from a mixture which contains a minute amount of gallium such as an ore extracted from mines or used electronic components while suppressing the quantity of waste liquid generated and thereby suppressing the disadvantages of the prior art described above. For example, it is also possible to concentrate the gallium up to a certain extent of concentration according to the present embodiment and further concentrate the obtained product by the methods of PLTs 1 to 3.

Except for the above description, this embodiment is the same as the first embodiment. In the present embodiment described above, the method and apparatus for concentrating the gallium compound were explained. However, the invention not limited to a gallium compound. In the same way as the first embodiment, it can be applied to compounds of indium, germanium, tellurium, and cesium.

Figure 4:
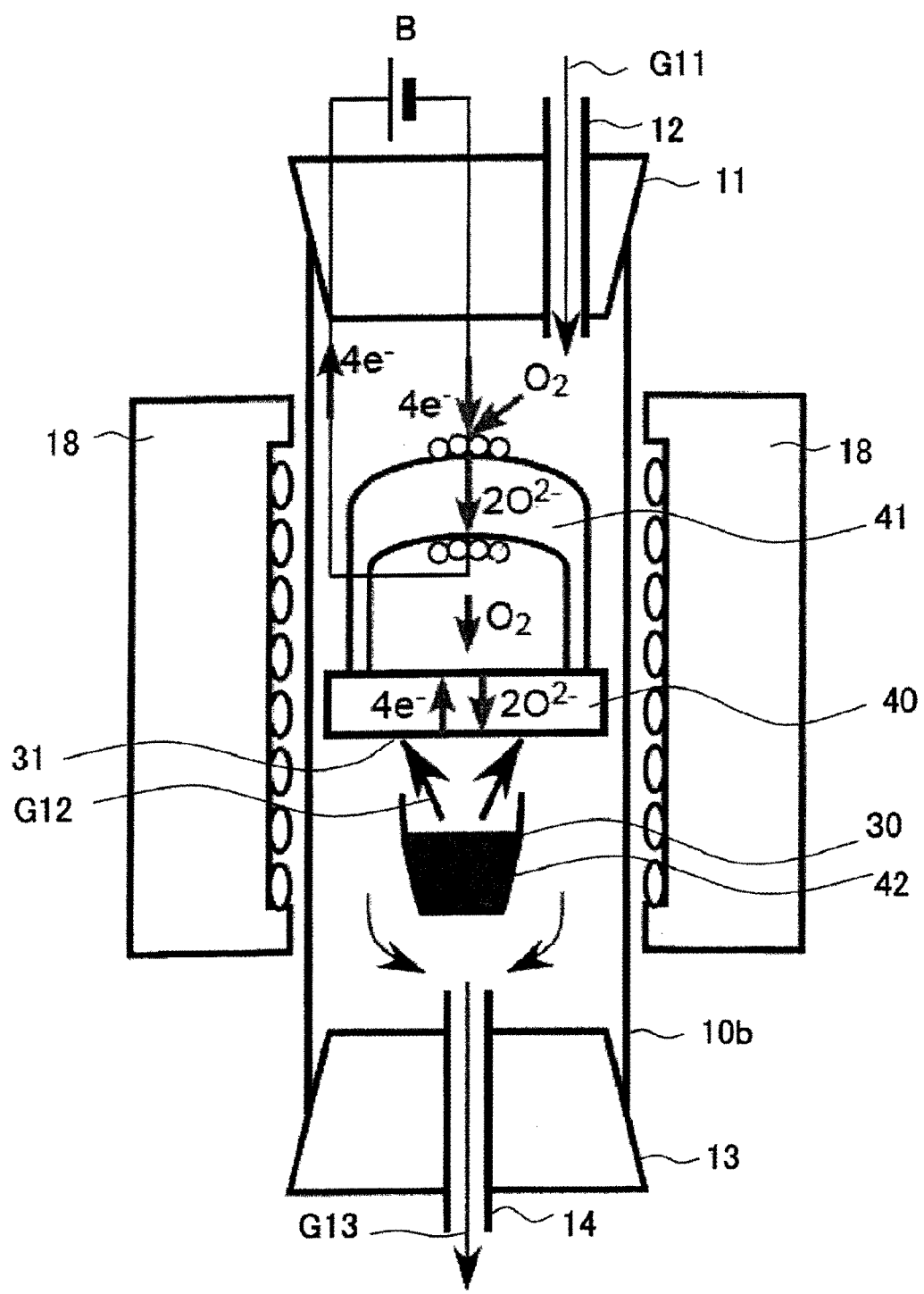
FIG. 4 is a schematic view of the configuration of an apparatus for concentration of a metal compound according to a modification of the third embodiment of the present invention.

FIG. 4 is a schematic view of the configuration of an apparatus for concentration of a metal compound according to a modification of the present embodiment.

In the same way as the apparatus for concentration of the metal compound shown in FIG. 3, for example, inside the first reaction tube 10*b*, on the flat plate-shaped collecting substrate 40, the second reaction tube 41 having an opening provided in its lower part is provided arranged so that the opening is closed by the surface of the collecting substrate 40. In the lower part of the collecting substrate 40 inside the first reaction tube 10*b*, the melting pot 42 accommodating the mixture of the first solid gallium compound at the first gallium content therein is provided. The upper opening of the first reaction tube 10*b* is closed by the upper cap 11, the upper glass tube 12 is provided penetrating through the upper cap 11, the lower opening is closed by the lower cap 13, and the lower glass tube 14 is provided penetrating through the lower cap 13.

For example, the second reaction tube 41 is constituted by a material whereby oxide ions are conducted through the internal portion when voltage is applied. When a voltage is applied by connecting the cathode of the external DC power supply B to the inner surface of the second reaction tube 41 and connecting the anode to the external surface of the second reaction tube 41, the second reaction tube 41 functions as an oxygen pump so that the oxygen which has been in the external portion in the vicinity of the upper end of the second reaction tube 41 becomes oxide ions which are conducted from the external surface of the second reaction tube 41 to the inner surface, which becomes oxygen on the inner surface in the vicinity of the upper end of the second reaction tube 41, and which thus introduces oxygen to the internal portion in the vicinity of the upper end of the second reaction tube 41. In the space surrounded by the second reaction tube 41 and the collecting substrate 40, the oxygen is transferred to the collecting substrate 40 side.

For example, the collecting substrate 40 is constituted by an oxygen permeable material and makes oxygen permeate therethrough from the surface of the collecting substrate 40 on the side where the second reaction tube 41 is provided to the surface on the side opposite to the side where the second reaction tube 41 is provided. Alternatively, the collecting substrate 40 is constituted by an oxide ion-electron mixed conducting material, conducts the oxide ion from the surface of the collecting substrate 40 on the side where the second reaction tube 41 is provided to the surface on the side opposite to the side where the second reaction tube 41 is provided, conducts electrons in the inverse direction, mixes the oxide ion and electrons, and conducts the results, whereby oxygen substantially can be transmitted there through.

By making a mixed gas G11 of nitrogen ($N_2$) or another carrier gas and gaseous water ($H_2O$) flow into the first reaction tube 10*b* from the upper glass tube 12 and heating this to a predetermined temperature by the heater 18, the first solid gallium compound in the mixture of the first solid gallium compound in the evaporating section 30 constituted by the melting pot 42 is reduced to generate the gaseous gallium compound, a gas G12 which contains the gaseous gallium compound is transferred onto the surface of the collecting substrate 40 and is oxidized on the surface of the collecting substrate 40 by the second reaction tube 41 functioning as the oxygen pump, the oxygen permeated through the collecting substrate 40 is used to generate the second solid gallium compound, and the generated second solid gallium compound is collected on the surface of the collecting section 31 constituted by the collecting substrate 40 at the second gallium content which is higher than the first gallium content. An exhaust gas G13 which contains the unreacted component is discharged from the lower glass tube 14.

Except for the above description, this is the same as the apparatus for concentration of the metal compound shown in FIG. 3.

Figure 5:
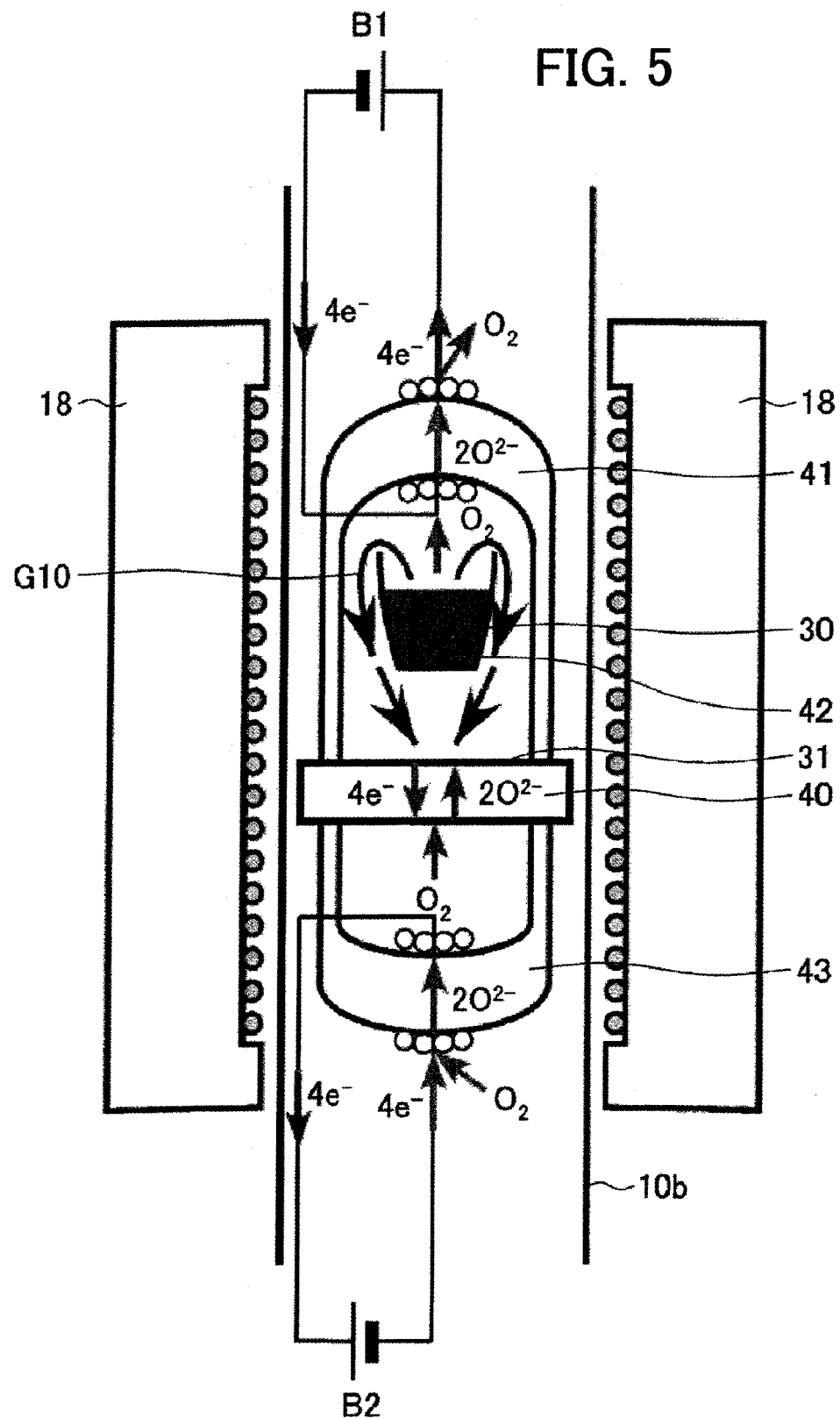
FIG. 5 is a schematic view of the configuration of an apparatus for concentration of a metal compound according to a modification of the third embodiment of the present invention.

FIG. 5 is a schematic view of the configuration of an apparatus for concentration of a metal compound according to a modification of the present embodiment.

In the apparatus for concentration of metal compound shown in FIG. 5, on the surface of the collecting substrate on the side opposite to the side where the second reaction tube 41 is provided, a third reaction tube 43 having an opening provided in its upper part is provided arranged so that the opening is closed by the surface of the collecting substrate 40.

In the same way as the second reaction tube 41 and third reaction tube 43, this is constituted by a material whereby the oxide ions are conducted through the internal portion when a voltage is applied.

By connecting a cathode of an external DC power supply B1 to the external surface of the second reaction tube 41 and connecting the anode to the inner surface of the second reaction tube 41 and applying voltage, the second reaction tube 41 functions as an oxygen pump, and oxygen is removed from the internal portion in the vicinity of the upper end of the second reaction tube 41. By removing oxygen to form a reduction atmosphere and heating this to a predetermined temperature by the heater 18, the first solid gallium compound in the mixture of the first solid gallium compound in the evaporating section 30 constituted by the melting pot 42 is reduced, and thus the gaseous gallium compound is generated. The gas G10 which contains the generated gaseous gallium compound rides the gas stream formed due to the difference of concentration of gaseous gallium compound and is transferred onto the surface of the collecting substrate 40.

On the other hand, by connecting a cathode of an external DC power supply B2 to the inner surface of the third reaction tube 43 and connecting an anode to the external surface of the third reaction tube 43 and applying voltage, the third reaction tube 43 functions as an oxygen pump whereby oxygen is introduced to the internal section in the vicinity of the lower end of the third reaction tube 43. In a space surrounded by the third reaction tube 43 and the collecting substrate 40, the oxygen is transferred to the collecting substrate 40 side and further permeates through the collecting substrate 40. The above gaseous gallium compound is oxidized on the surface of the collecting substrate 40 by the oxygen permeated through the collecting substrate 40 to generate the second gaseous gallium compound, and the generated second gaseous gallium compound is collected on the surface of the collecting section 31 constituted by the collecting substrate 40 at the second gallium content which is higher than the first gallium content. Except for the above description, this is the same as the apparatus for concentration of the metal compound shown in FIG. 3.

In the present embodiment described above, the method and apparatus for concentrating the gallium compound were explained. However, the invention is not limited to a gallium compound. In the same way as the first embodiment, it can be applied to compounds of indium, germanium, tellurium, and cesium.

First Example

Table 1 shows the composition of a mixture which contains a gallium compound constituted by a natural ore I and the composition of a portion of a simulated ore which imitates the ore I other than gallium oxide ($Ga_2O_3$).

The gallium oxide ($Ga_2O_3$) content of the simulated ore is about 1 wt % and is 0.74 wt % if converted to gallium (Ga). Further, the gallium (Ga) content of the ore I is 50 ppm (0.005 wt %).

In the present example, the apparatus and method for concentrating the gallium compound according to the first embodiment were used. The above simulated ore was used as the starting material, the reducing agent activated carbon was mixed, this mixed powder was set in a central part of a 3-zone electric furnace, and an $Al_2O_3$ sintered body was set in the lower part of the 3-zone electric furnace. The central part was heated to 1150° C. and the lower part was heated to 800° C. to 1150° C. while running $N_2$ gas from the upper part toward the lower part in the 3-zone electric furnace to thereby concentrate the gallium compound.

TABLE 1

| Ore I (unit: wt %) | $SiO_2$ | $Al_2O_3$ | MgO | CaO | $Fe_2O_3$ | Moisture | Ig. loss |
|---|---|---|---|---|---|---|---|
|  | 43.79 | 13.55 | 10.86 | 9.45 | 8.87 | 4.61 | 10.51 |
| Simulated ore (unit: wt %) | $SiO_2$ | $Al_2O_3$ | $MgCO_3$ | $CaCO_3$ | $Fe_2O_3$ |  |  |
|  | 40 | 14 | 20 | 15 | 10 |  |  |

FIGS. 6A and 6B are graphs showing temperature profiles with respect to the positions of the reaction tube according to the present example. The position of the reaction tube is indicated by a distance X from the upper end when the upper end of the reaction tube is defined as 0 cm.

FIG. 6A is a temperature profile when the first heater was turned off (no heating), the second heater was set at 1150° C., and the third heater was set at 900° C.

FIG. 6B is a temperature profile when the first heater was turned off (no heating), the second heater was set at 1150° C., and the third heater was set at 1000° C.

As shown in FIGS. 6A and 6B, in a region where the distance X of the reaction tube was about 15 cm to 40 cm, a region exceeding 1000° C. was obtained. Further, in a region where the distance X of the reaction tube was about 10 cm to 45 cm, a region exceeding 900° C. was obtained.

FIG. 7 shows the results by concentrating the gallium compound using the above simulated ore as a starting material and measuring the spectrum of X-ray photoelectron spectroscopy (XPS) of the obtained collected object. An abscissa shows a binding energy E of a 1160 eV to 1110 eV region, and an ordinate shows the intensity I (relative value) of photoelectrons. In the graph, the binding energies corresponding to Ga ($2p_{1/2}$) and Ga ($2p_{3/2}$) are indicated by broken lines.

Here, the first heater was turned off (no heating), the second heater was set at 1150° C., and the temperature of the third heater was set at 800° C. for "a", 850° C. for "b", 900° C. for "c", 950° C. for "d", 1000° C. for "e", 1050° C. for "f", 1100° C. for "g", and 1150° C. for "h".

As shown in FIG. 7, by turning the first heater off (no heating), setting the second heater at 1150° C., and setting the third heater at 800 to 1150° C., a peak corresponding to Ga was obtained in the XPS, and thus existence of the Ga compound in the collected object was confirmed.

The temperatures described above were temperatures consistent with the temperatures 900° C. or more where the $Ga_2O$ was generated in the reaction of Chemical Formula (1) described above according to thermodynamic calculation.

Figure 8:
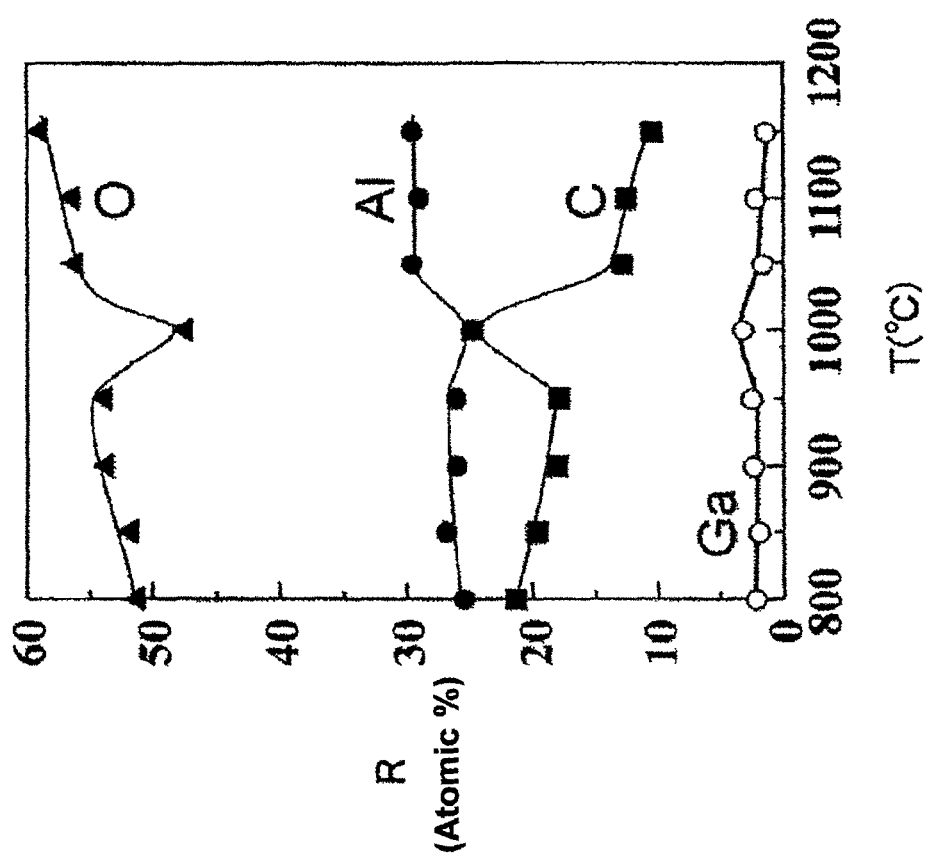
FIG. 8 is a graph showing a heat treatment temperature dependence of element content in a collected object obtained from the spectrum of X-ray photoelectron spectroscopy (XPS) according to the first example of the present invention.

FIG. 8 is a graph showing a heat treatment temperature dependence of the element content in the collected object which was obtained from the spectrum of X-ray photoelectron spectroscopy (XPS) according to the present example.

The abscissa shows the set temperature T of the third heater, and the ordinate shows the content R (atm %) of each element.

It is seen that the concentration of the Ga component on the surface of the $Al_2O_3$ sintered body constituting the collecting substrate when setting the third heater at 1000° C. is the highest.

Therefore, when using an actual ore I and setting the third heater at 1000° C. to concentrate a gallium compound, the concentrations of ingredients on the surface of the $Al_2O_3$ sintered body constituting the collecting substrate according to X-ray photoelectron spectroscopy (XPS) were the O: 65.6 atm %, Al: 18.9 atm %, C: 10.2 atm %, Si: 4.3 atm %, Ga: 1 atm %, and Ca: 0.1 atm %.

When eliminating the contribution from the $Al_2O_3$ sintered body with respect to this analysis result, the results became O: 65.3 wt %, C: 13.4 wt %, Si: 13.2 wt %, Ga: 7.6 wt %, and Ca: 0.4 wt %. The concentration of gallium became 35.8 wt % among the metal components.

As described above, in the present example, the gallium content could be raised up to 35.8 wt % with respect to the ore I having a gallium content of 50 ppm (0.005 wt %) of the gallium compound before concentration.

Second Example

Figure 9A:
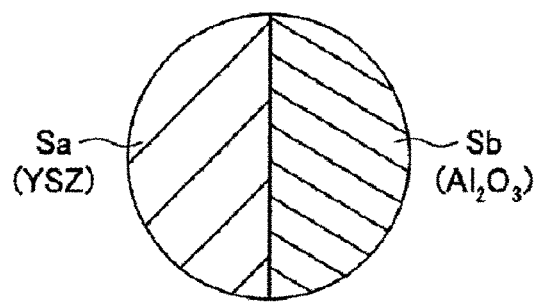
FIG. 9A is a schematic plan view of a collecting substrate according to the second example of the present invention, and FIGS.

FIG. 9A is a schematic plan view of a collecting substrate according to the present example.

As the collecting substrate, use was made of a substrate formed by shaping a yttria-stabilized zirconia (YSZ) substrate Sa and an alumina sintered body substrate Sb to semi-circular plates and joining them to a disc state. Using a material which contains gallium ($SiO_2$: 32%, $Al_2O_3$: 12%, $MgCO_3$: 16%, $CaCO_3$: 12%, $Fe_2O_3$: 8%, $Ga_2O_3$: 20%) as the starting material, the same procedure was followed as in the first example to heat the central part to 1150° C. and the lower part to 1000° C. to concentrate the gallium compound so as to investigate the difference of effect with respect to the concentration of the gallium compound due to the difference of the collecting substrate.

Figure 9B:
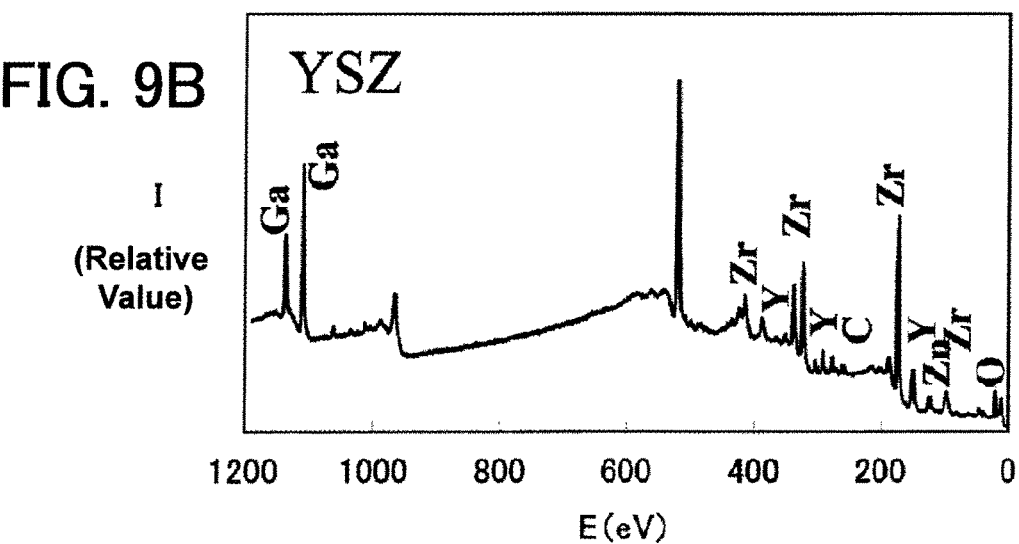
FIGS. 9B and 9C are spectrums of X-ray photoelectron spectroscopy (XPS).

FIG. 9B is a spectrum of X-ray photoelectron spectroscopy (XPS) of a collected object on a collecting substrate made of YSZ.

Figure 9C:
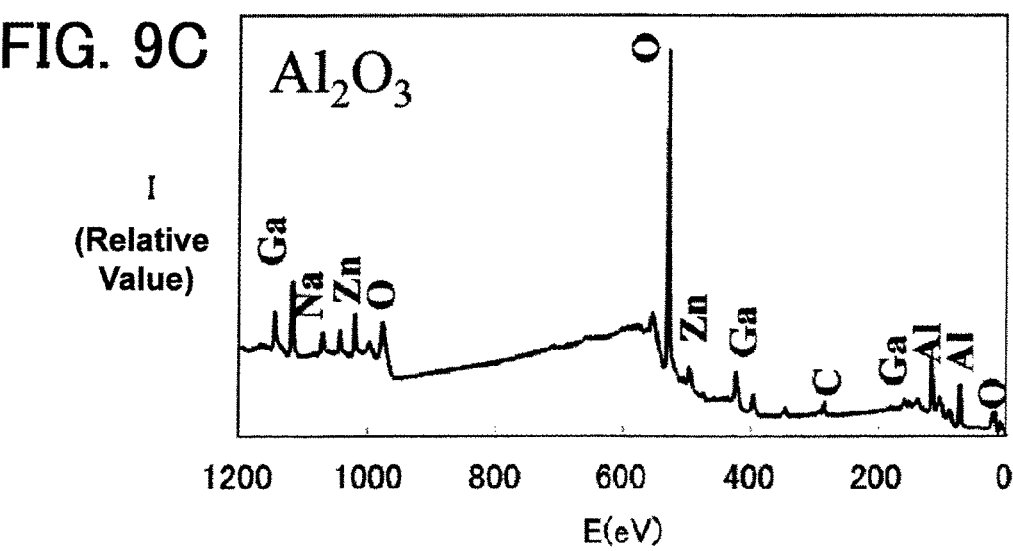

FIG. 9C is a spectrum of X-ray photoelectron spectroscopy (XPS) of a collected object on a collecting substrate made of an alumina sintered body.

In contrast to the gallium concentration of the collected object on the surface of the collecting substrate made of an alumina sintered body being 3.4 atm %, the gallium concentration of the collected object on the surface of the collecting substrate made of YSZ was 9.8 atm %. The gallium concentration was higher in the case where the YSZ was used than that of the case where the alumina sintered body was used as the collecting substrate. The reason for this is considered to be that the $Ga_2O$ was oxidized by oxygen released from the collecting substrate.

Even in a case where a substrate having an oxygen storage capability such as a ceria-zirconia solid solution was used as the collecting substrate, the effect for concentrating gallium became high in the same way as that described above.

Third Example

In the present example, using the apparatus and method for concentrating the gallium compound according to the first embodiment, the reducing agent activated carbon was mixed with ITO powder. This mixed powder was set in a central part of a vertical type 3-zone electric furnace, while the $Al_2O_3$ sintered body was set in the lower part of the 3-zone electric furnace. The indium compound was concentrated by heating the central part to 700° C. and heating the lower part to 350° C. while making $N_2$ gas flow in from the upper part to the lower part in the 3-zone electric furnace.

Figure 10:
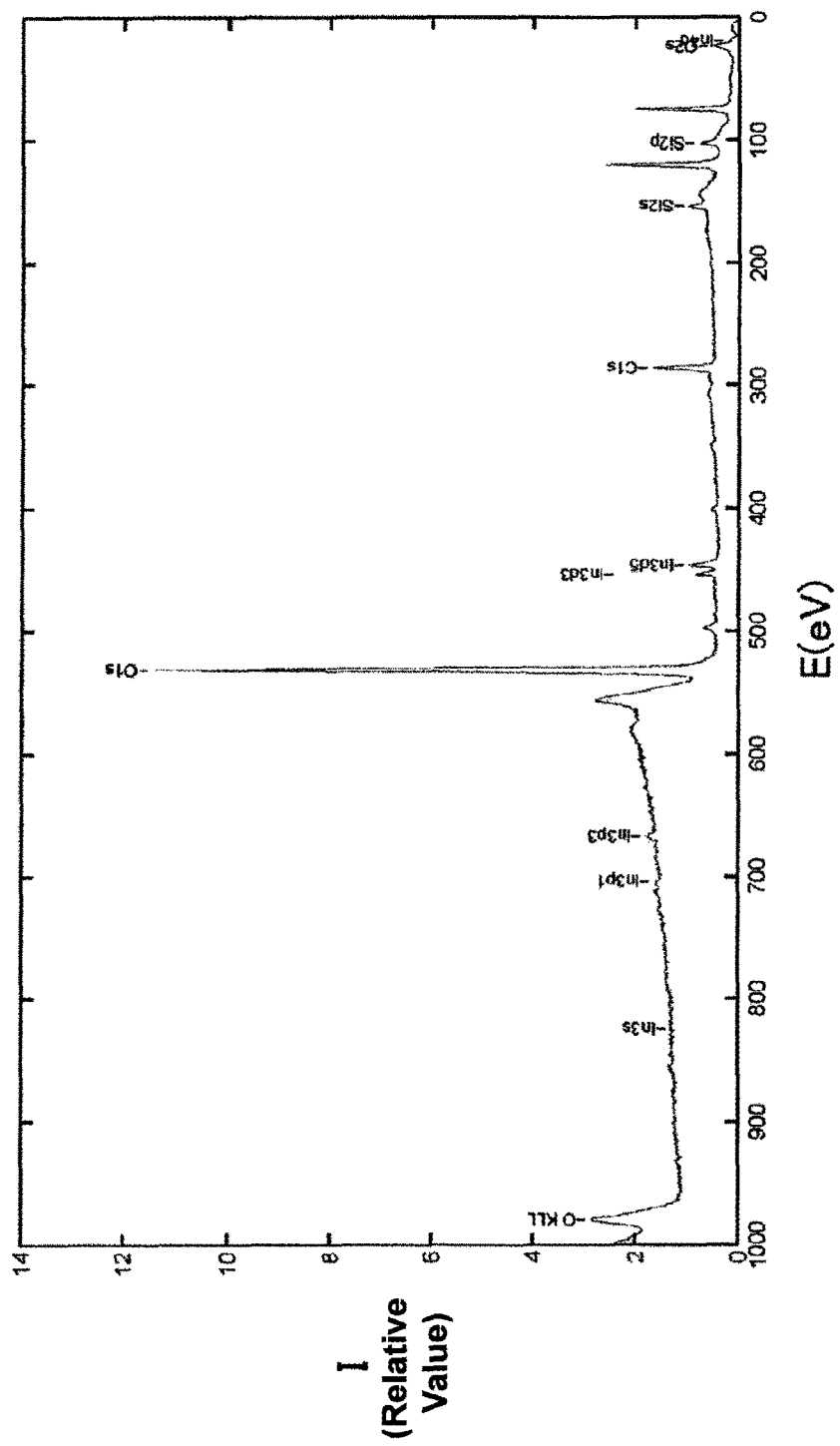
FIG. 10 is a spectrum of X-ray photoelectron spectroscopy (XPS) according to the third example of the present invention.

FIG. 10 is a spectrum of X-ray photoelectron spectroscopy (XPS) according to a third example of the present invention.

In FIG. 10, 74.4 atm % of oxygen (O), 20.1 atm % of carbon (C), 4.5 wt % of silicon (Si), and 1.0 atm % of indium (In) were detected. It was confirmed that the In compound existed in the collected object. A peak corresponding to Sn was not detected, therefore it was confirmed that In could be separated and collected from the ITO. In the above description, the silicon (Si) was detected because of contamination from glass wool.

The above temperature was a temperature consistent with the temperature 700° C. or more at which $In_2O$ was generated in the reaction of Chemical Formula (3) described above according to thermodynamic calculations.

Comparative Example

Figure 11:
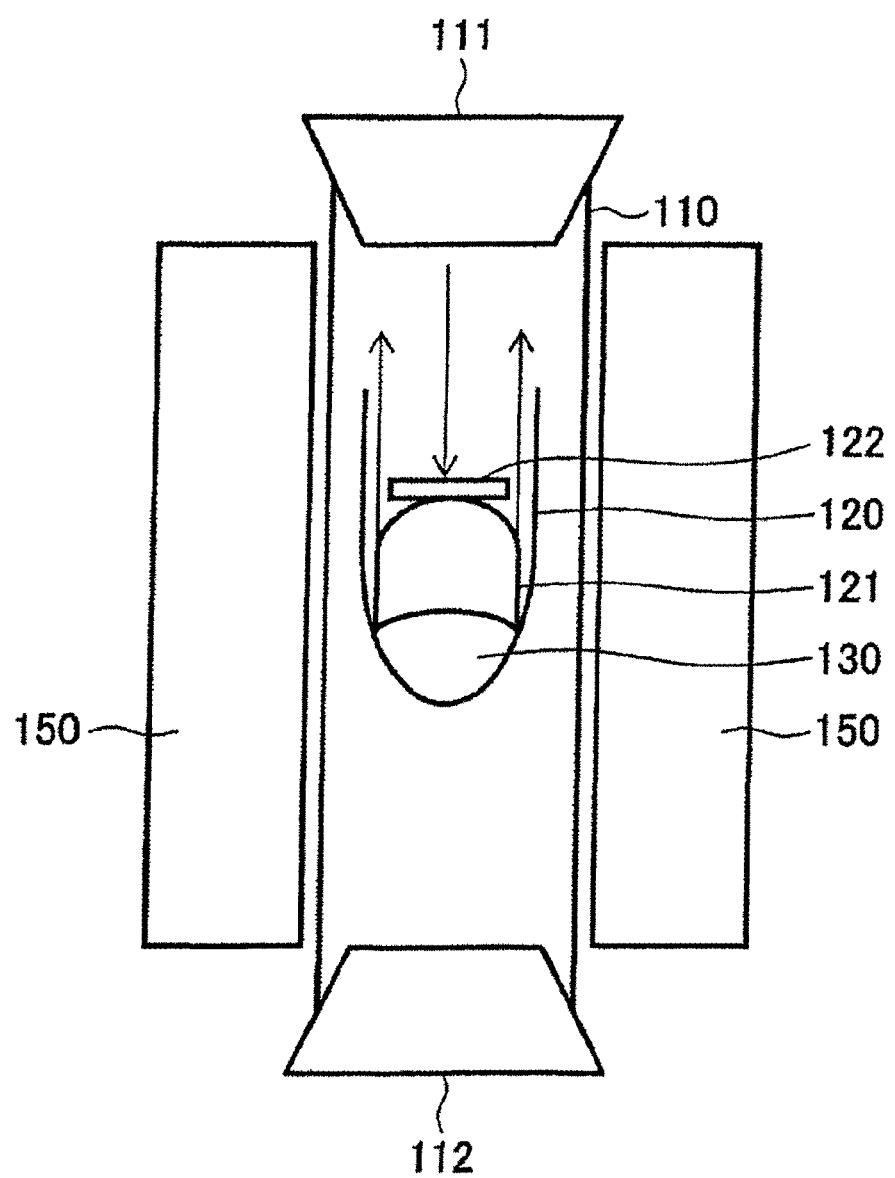
FIG. 11 is a schematic view of the configuration of an apparatus according to a comparative example.

FIG. 11 is a schematic view of the configuration of an apparatus according to a comparative example.

An upper opening of a reaction tube 110 is closed by an upper cap 111, and a lower opening of the reaction tube 110 is closed by a lower cap 112.

Inside the reaction tube 110, a Tammann tube 120 is provided. The upper end of the Tammann tube 120 is opened and is communicated with the space inside the reaction tube 110. Further, the lower end of the Tammann tube 120 is closed.

Inside the Tammann tube 120, a substrate stand 121 formed by a Tammann tube is provided. On the substrate stand 121, a collecting substrate 122 such as an alumina substrate is held.

A mixture of a solid gallium compound is accommodated inside the Tammann tube 120 having the above constitution.

On the outer circumference of the reaction tube 110, a heater 150 heating the internal portion of the reaction tube 110 is provided.

The solid gallium compound is heated by the heater 150. The internal portion of the Tammann tube 120 will be referred to as the evaporating section 130.

In the present comparative example, the ore I shown in the above examples and the reducing agent graphite were mixed at a weight ratio of 1:1. This mixed powder was accommodated in the evaporating section of the apparatus shown in FIG. 11, then the heater was heated to 1000° C. and was kept there for 2 hours.

Figure 12:
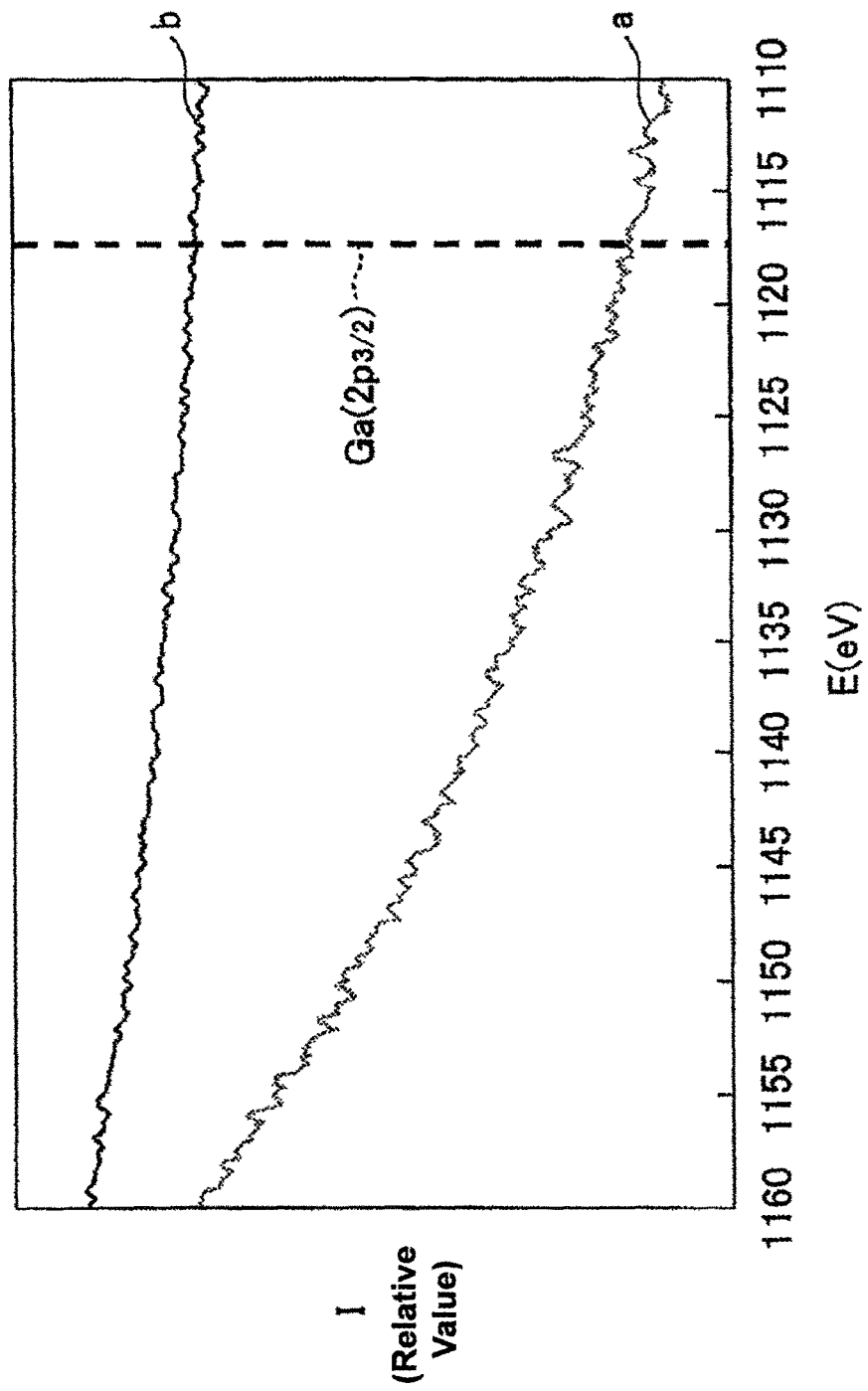
FIG. 12 is a spectrum of X-ray photoelectron spectroscopy (XPS) according to the comparative example.

FIG. 12 is a spectrum of X-ray photoelectron spectroscopy (XPS) according to the comparative example. This shows the results of accommodating the mixed powder of the above ore I and the reducing agent graphite in the evaporating section of the apparatus shown in FIG. 11, heating the heater to 1000° C. and keeping it there for 2 hours, then measuring the XPS of the obtained collected object. This is indicated by "a" in FIG. 12.

The abscissa shows the binding energy E of the 1160 eV to 1110 eV region, and the ordinate shows the intensity I (relative value) of photoelectrons. In the graph, the binding energy corresponding to Ga ($2p_{3/2}$) is indicated by a broken line.

Further, XPS was measured also for the powder of ore I. The obtained result is indicated by "b" in FIG. 12.

As indicated by "a" in FIG. 12, a peak corresponding to Ga did not appear in the XPS according to the present comparative example.

Further, as indicated by "b" in FIG. 12, a peak corresponding to Ga did not appear in the XPS of the powder of the ore I.

The present invention is not limited to the above explanation.

For example, as the mixture of compounds of metals such as gallium, indium, germanium, tellurium, and cesium, other than the ore extracted from mines, used electronic components may be used.

Further, the heater for performing heat treatment was separated to three in the above embodiments and use was made of heaters which could be individually controlled, but the treatment can be carried out by one heater. Further, a constitution using two or more heaters other than three may be employed as well.

Oxygen is consumed in the chemical reaction formulas shown in the present embodiment, but it may be supplied from the upper glass tube or the like, and the already existing ingredient may be used in the reaction tube.

A monitoring device other than a thermocouple may be used for temperature monitoring as well. Further, the temperature control of each heater may be carried out by performing feedback of the temperature value monitored from a thermocouple etc. as well.

In the above embodiments, activated carbon was used as the reducing agent, but it is also possible to use another reducing agent.

The present invention can be applied to a compound of a metal element capable of a chemical reaction where a gaseous metal compound is formed by reducing a first solid metal compound in the mixture of the first solid metal compound which contains the metal at the first metal content and where the obtained gaseous metal compound is oxidized to form the second solid metal compound. Specifically, other than gallium, the present invention can be applied to a compound of indium, germanium, tellurium, and cesium.

Other than this, various alterations are possible so far as it is not out of the gist of the present invention.

REFERENCE SIGNS LIST

10 . . . reaction tube, 10a . . . first reaction tube, 10b . . . first reaction tube, 11 . . . upper cap, 11a . . . first upper cap, 11b . . . second upper cap, 12 . . . upper glass tube, 12a . . . first upper glass tube, 12b . . . second upper glass tube, 13 . . . lower cap, 14 . . . lower glass tube, 15 . . . first heater, 15a . . . first thermocouple, 16 . . . second heater, 16a . . . second thermocouple, 17 . . . third heater, 17a . . . third thermocouple, 18 . . . heater, 20 . . . first Tammann tube, 20a . . . nozzle, 21 . . . second Tammann tube, 22 . . . third Tammann tube, 22a . . . Tammann tube exhaust port, 23 . . . substrate stand, 23a . . . collecting substrate, 24 . . . second reaction tube, 24a . . . nozzle, 25 . . . first melting pot, 26 . . . second melting pot, 30 . . . evaporating section, 31 . . . collecting section, 40 . . . collecting substrate, 41 . . . second reaction tube, 42 . . . melting pot, 43 . . . third reaction tube, G1 . . . carrier gas, G2 . . . evaporated gas, G3 . . . mixed gas which contains gallium, G4 . . . exhaust gas, G5 . . . mixed gas, G6 . . . mixed gas, G7 . . . evaporated gas, G8 . . . mixed gas which contains gallium, G9 . . . exhaust gas, G10 . . . gas which contains gaseous gallium compound, G11 . . . carrier gas, G12 . . . gas which contains gaseous gallium compound, G13 . . . exhaust gas, and B, B1, B2 . . . external DC power supplies.

The invention claimed is:

1. A method of concentrating a metal compound, comprising:
    heating a mixture of a first solid gallium compound containing a first concentration of gallium, thereby to reduce the first solid gallium compound to form a gaseous gallium compound;
    adjusting a temperature and oxygen partial pressure such that the gaseous gallium compound has a vapor pressure of 1 kPa or more;
    oxidizing the gaseous gallium compound to form a second solid gallium compound containing a second concentration of gallium, the second concentration of gallium being higher than the first concentration of gallium; and
    adjusting a temperature and oxygen partial pressure such that a vapor pressure of the second solid gallium compound is 1/10 or less of a vapor pressure of the gaseous gallium compound.

2. The method according to claim 1, wherein the first concentration is 10 ppm to 1000 ppm, and the second concentration is more than 5 wt %.

3. The method according to claim 1, wherein
    the gaseous gallium compound is $Ga_2O$, and
    the second solid gallium compound is $Ga_2O_3$.

4. A method of concentrating a metal compound, comprising:
    heating a mixture of a first solid indium compound containing a first concentration of indium, thereby to reduce the first solid indium compound to form a gaseous indium compound;
    adjusting a temperature and oxygen partial pressure such that the gaseous indium compound has a vapor pressure of 1 kPa or more;
    oxidizing the gaseous indium compound to form a second solid indium compound containing a second concentration of indium, the second concentration of indium being higher than the first concentration of indium; and
    adjusting a temperature and oxygen partial pressure such that a vapor pressure of the second solid indium compound is 1/10 or less of a vapor pressure of the gaseous indium compound.

5. The method according to claim 4, wherein the second concentration of indium is more than 1.0 atm %.

6. The method according to claim 4, wherein
    the gaseous indium compound is $In_2O$, and
    the second solid indium compound is $In_2O_3$.

7. A method of concentrating a metal compound, comprising:
    heating a mixture of a first solid metal compound containing a first concentration of metal selected from a group consisting of germanium, tellurium, and cesium, thereby to reduce the first solid metal compound to form a gaseous metal compound;
    adjusting a temperature and oxygen partial pressure such that the gaseous metal compound has a vapor pressure of 1 kPa or more;
    oxidizing the gaseous metal compound to form a second solid metal compound containing a second concentration of the metal, the second concentration of the metal being higher than the first concentration of the metal; and
    adjusting a temperature and oxygen partial pressure such that a vapor pressure of the second solid metal compound is 1/10 or less of a vapor pressure of the gaseous metal compound.

8. The method according to claim 7, wherein
    the metal is germanium, and
    the heating the mixture of the first solid metal compound includes heating the mixture of the first solid metal compound at a temperature between 700° C. and 1150°

C., thereby to reduce the first solid metal compound to form the gaseous metal compound.

9. The method according to claim 7, wherein
the metal is tellurium, and
the heating the mixture of the first solid metal compound includes heating the mixture of the first solid metal compound at a temperature between 200° C. and 1150° C., thereby to reduce the first solid metal compound to form the gaseous metal compound.

10. The method according to claim 7, wherein
the metal is cesium, and
the heating the mixture of the first solid metal compound includes heating the mixture of the first solid metal compound at a temperature between room temperature and 1150° C., thereby to reduce the first solid metal compound to form the gaseous metal compound.

11. The method according to claim 1, wherein
the heating the mixture of the first solid gallium compound includes heating the mixture of the first solid gallium compound at a temperature between 900° C. and 1150° C., thereby to reduce the first solid gallium compound to form the gaseous gallium compound.

12. The method according to claim 4, wherein
the heating the mixture of the first solid indium compound includes heating the mixture of the first solid indium compound at a temperature between 700° C. and 1150° C., thereby to reduce the first solid indium compound to form the gaseous indium compound.

* * * * *